United States Patent
Kim et al.

(10) Patent No.: US 11,810,535 B2
(45) Date of Patent: *Nov. 7, 2023

(54) DISPLAY DRIVER, CIRCUIT SHARING FRAME BUFFER, MOBILE DEVICE, AND OPERATING METHOD THEREOF

(71) Applicant: SAMSUNG ELECTRONICS CO., LTD., Suwon-si (KR)

(72) Inventors: Taewoo Kim, Hwaseong-si (KR); Hongki Kwon, Seongnam-si (KR); Jaehun Kim, Hwaseong-si (KR); Jinyong Park, Suwon-si (KR); Jaeyoul Lee, Hwaseong-si (KR); Hyunwook Lim, Seoul (KR); Woohyuk Jang, Hwaseong-si (KR); Hojun Chung, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/393,691

(22) Filed: Aug. 4, 2021

(65) Prior Publication Data

US 2021/0366442 A1 Nov. 25, 2021

Related U.S. Application Data

(63) Continuation of application No. 16/584,228, filed on Sep. 26, 2019, now Pat. No. 11,087,721.

(30) Foreign Application Priority Data

Nov. 28, 2018 (KR) .......................... 10-2018-0149200
Apr. 3, 2019 (KR) .......................... 10-2019-0039070

(51) Int. Cl.
  *G09G 5/393* (2006.01)
  *G06T 5/00* (2006.01)
  *G06T 5/50* (2006.01)

(52) U.S. Cl.
  CPC ............. *G09G 5/393* (2013.01); *G06T 5/003* (2013.01); *G06T 5/50* (2013.01);
  (Continued)

(58) Field of Classification Search
  CPC ........... G09G 5/393; G09G 2320/0261; G09G 2320/106; G09G 2340/02; G09G 2360/18;
  (Continued)

(56) References Cited

U.S. PATENT DOCUMENTS 5,625,386 A * 4/1997 Howard ................. G06F 3/14
                                                          345/566
6,825,821 B2 11/2004 Oda et al.
(Continued)

FOREIGN PATENT DOCUMENTS

EP      2791757        10/2014
KR   10-0590326         6/2006
(Continued)

OTHER PUBLICATIONS

Office Action dated Oct. 8, 2020 in corresponding U.S. Appl. No. 16/584,228.

*Primary Examiner* — Jin Ge
(74) *Attorney, Agent, or Firm* — F. Chau & Associates, LLC

(57) ABSTRACT

A display driver circuit includes a receiver that receives a still image or a moving image, a frame buffer that stores the still image received by the receiver in a still image mode, an image processor that performs an image enhancement operation on the moving image transferred from the receiver or (Continued)

the still image transferred from the frame buffer, and a motion processor that performs a motion compensation operation using a current frame output from the image processor and a previous frame stored in the frame buffer in a moving image mode. The previous frame is data which, in the moving image mode, are processed by the image processor before the current frame and are then stored in the frame buffer. The previous frame is output from the frame buffer to the motion processor in synchronization with the current frame.

20 Claims, 16 Drawing Sheets

(52) U.S. Cl.
CPC ............. *G06T 2207/20201* (2013.01); *G09G 2310/0297* (2013.01); *G09G 2320/0261* (2013.01); *G09G 2320/106* (2013.01); *G09G 2340/02* (2013.01); *G09G 2360/18* (2013.01)

(58) Field of Classification Search
CPC . G06T 5/003; G06T 5/50; G06T 2207/20201; G06T 2310/0297
USPC ......................................................... 345/618
See application file for complete search history.

(56) References Cited

U.S. PATENT DOCUMENTS

| | | | |
|---|---|---|---|
| 8,115,713 | B2 | 2/2012 | Tagami |
| 8,259,050 | B2 | 9/2012 | Yun |
| 8,692,839 | B2 | 4/2014 | Wiley et al. |
| 9,159,284 | B2 | 10/2015 | Park et al. |
| 9,202,445 | B2 | 12/2015 | Um et al. |
| 9,754,343 | B2 | 9/2017 | Ko et al. |
| 2002/0012006 | A1* | 1/2002 | Yamada ................... G09G 3/20 345/660 |
| 2004/0101051 | A1 | 5/2004 | Ishii |
| 2005/0200590 | A1 | 9/2005 | Kumekawa |
| 2010/0091185 | A1 | 4/2010 | Ueno et al. |
| 2011/0310980 | A1 | 12/2011 | Mathew |
| 2013/0155090 | A1* | 6/2013 | Pourbigharaz ........ G06F 1/3265 345/589 |
| 2015/0194083 | A1 | 7/2015 | Sinha et al. |
| 2016/0070386 | A1 | 3/2016 | Yamamoto et al. |
| 2017/0295325 | A1* | 10/2017 | Yoon ..................... H04N 5/3452 |
| 2018/0007365 | A1* | 1/2018 | Lawrence ............ H04N 19/162 |
| 2018/0218667 | A1 | 8/2018 | Yamazumi et al. |
| 2019/0304059 | A1* | 10/2019 | Suyama ................... G06T 5/009 |
| 2020/0082745 | A1 | 3/2020 | Tung et al. |
| 2020/0168183 | A1 | 5/2020 | Kim et al. |

FOREIGN PATENT DOCUMENTS

| | | |
|---|---|---|
| KR | 10-2014-0105564 | 9/2014 |
| KR | 10-2015-0009128 | 1/2015 |

\* cited by examiner

DISPLAY DRIVER, CIRCUIT SHARING FRAME BUFFER, MOBILE DEVICE, AND OPERATING METHOD THEREOF

CROSS-REFERENCE TO RELATED APPLICATIONS

This application is a continuation application of U.S. patent application Ser. No. 16/584,228 filed Sep. 26, 2019, which claims priority under 35 U.S.C. § 119 to Korean Patent Application Nos. 10-2018-0149200 filed on Nov. 28, 2018, and 10-2019-0039070 filed on Apr. 3, 2019, in the Korean Intellectual Property Office, the disclosures of which are incorporated by reference herein in their entireties.

TECHNICAL FIELD

Exemplary embodiments of the inventive concept relate to an electronic device, and more particularly, to a display driver circuit sharing a frame buffer, a mobile device including the display driver circuit, and an operating method thereof.

DISCUSSION OF THE RELATED ART

Motion detection and motion blur compensation technologies may be applied to a liquid crystal display (LCD) or an organic light-emitting diode (OLED) display used in a mobile device to improve the quality of reproduction of a moving image. When performing motion detection or motion blur compensation, a current frame and a previous frame may be compared with each other. In this case, it may be necessary to secure a memory capacity of a frame buffer for storing frame data.

The increase in the memory capacity of the frame buffer may cause an increase in a chip size, as well as an increase in power consumption of a display driving integrated circuit (DDI).

SUMMARY

Exemplary embodiments of the inventive concept provide a display driver circuit capable of using a frame buffer in both a moving image playing operation and a still image playing operation, a mobile device including the same, and an operating method thereof.

According to an exemplary embodiment, a display driver circuit includes a receiver that receives a still image or a moving image, a frame buffer that stores the still image received by the receiver in a still image mode, an image processor that performs an image enhancement operation on the moving image transferred from the receiver or the still image transferred from the frame buffer, and a motion processor that performs a motion compensation operation using a current frame output from the image processor and a previous frame stored in the frame buffer in a moving image mode. The previous frame is data which, in the moving image mode, are processed by the image processor before the current frame and are then stored in the frame buffer. The previous frame is output from the frame buffer to the motion processor in synchronization with the current frame.

According to an exemplary embodiment, a method of operating a display driver circuit includes identifying a mode of image data, performing, by an image processor, an image enhancement operation on a current frame when the mode of the image data corresponds to a moving image mode, performing, by a motion processor, a motion compensation operation on the current frame undergoing the image enhancement operation, and storing the current frame undergoing the image enhancement operation in a frame buffer.

According to an exemplary embodiment, a mobile device includes an application processor that generates a moving image or a still image, a display driver circuit that receives the moving image or the still image and outputs a driving signal, and a display that displays the moving image or the still image based on the driving signal. The display driver circuit stores a first frame of the moving image in a frame buffer after image enhancement processing is performed on the first frame, and, when a second frame following the first frame is received, the display driver circuit generates the driving signal by performing a motion compensation operation on the second frame based on the first frame stored in the frame buffer.

BRIEF DESCRIPTION OF THE DRAWINGS

The above and other features of the inventive concept will become more apparent by describing in detail exemplary embodiments thereof with reference to the accompanying drawings, in which.

DETAILED DESCRIPTION

Figure 1:
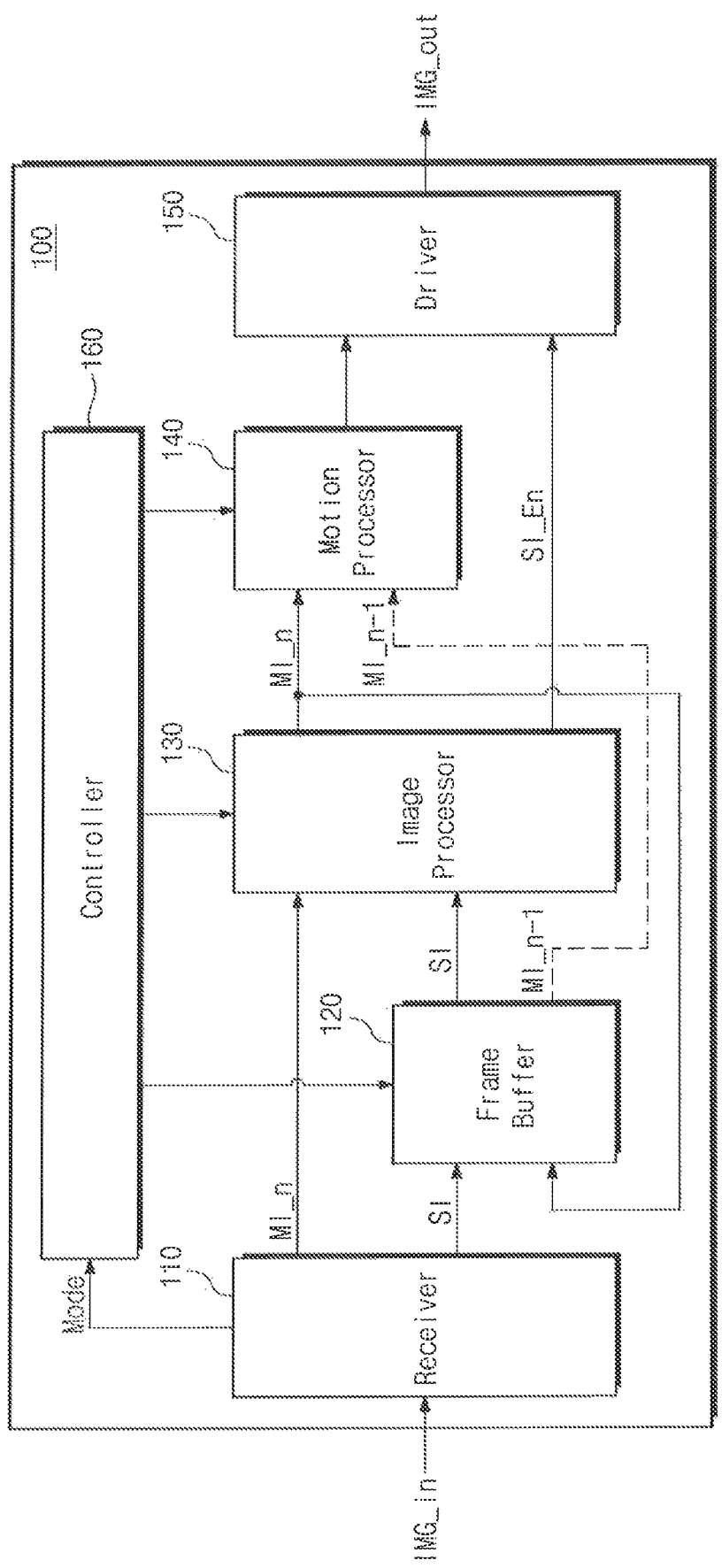
FIG. 1 is a block diagram illustrating a display driver circuit according to an exemplary embodiment of the inventive concept.

Exemplary embodiments of the inventive concept will be described more fully hereinafter with reference to the accompanying drawings. Like reference numerals may refer to like elements throughout the accompanying drawings.

It should be understood that the terms "first," "second," "third," etc. are used herein to distinguish one element from another, and the elements are not limited by these terms.

Thus, a "first" element in an exemplary embodiment may be described as a "second" element in another exemplary embodiment.

It should be further understood that descriptions of features or aspects within each exemplary embodiment should typically be considered as available for other similar features or aspects in other exemplary embodiments, unless the context clearly indicates otherwise.

Herein, an "image" has a comprehensive meaning including a moving image such as a video, as well as a still image such as a picture. Also, sequential frames of a moving image may be called a "previous frame, a "current frame", and a "next frame". The previous frame means a frame provided in front of the current frame, and the next frame means a frame following the current frame. In addition, in describing exemplary embodiments of the inventive concept, a compression ratio of a compression image may be described by using the term "two times" or "three times". However, the compression ratio of exemplary embodiments of the inventive concept is not limited thereto.

FIG. 1 is a block diagram illustrating a display driver circuit according to an exemplary embodiment of the inventive concept.

Referring to FIG. 1, a display driver circuit 100 may include a receiver 110, a frame buffer 120, an image processor 130, a motion processor 140, a driver 150, and a controller 160.

The receiver 110 receives image data IMG_in. The image data IMG_in may be received from a source located external to the display driver circuit 100 (e.g., from a source located outside of the display driver circuit 100). For example, the receiver 110 may receive the image data IMG_in from a host device. The receiver 110 may determine whether a mode of the image data IMG_in provided from the host is a moving image mode or a still image mode. For example, in an exemplary embodiment, the receiver 110 may determine a mode "Mode" of the image data IMG_in by using a command or a control signal that is provided from the host together with the image data IMG_in. In an exemplary embodiment, the receiver 110 may determine the mode "Mode" of the image data IMG_in by detecting information such as a pattern or a frame rate of the image data IMG_in without a command or a control signal. The receiver 110 transfers the detected mode "Mode" to the controller 160.

The receiver 110 transfers the input image data IMG_in to the frame buffer 120 or the image processor 130 based on the detected mode "Mode". For example, the receiver 110 recognizes the image data IMG_in transferred in the moving image mode as a moving image MI_n, and transfers the moving image MI_n to the image processor 130. In contrast, the receiver 110 recognizes the image data IMG_in transferred in the still image mode as a still image SI, and transfers the still image SI to the frame buffer 120.

The frame buffer 120 may store the input image data IMG_in and may transfer the stored image data IMG_in to the image processor 130 or the motion processor 140. In general, the frame buffer 120 stores the still image SI. The still image SI stored in the frame buffer 120 is transferred to the image processor 130 as much as the number of times corresponding to a given frame frequency FF. For example, the still image SI stored in the frame buffer 120 may be provided to the image processor 130 as much as the number of times corresponding to a frame frequency of 30 Hz or 60 Hz. The still image SI that is processed by the image processor 130 may be output as a driving signal IMG_out for driving a display through the driver 150.

In an exemplary embodiment, the frame buffer 120 may store a moving image of a previous frame MI_n−1 in the moving image mode. For example, a moving image of a current frame MI_n is transferred to the motion processor 140 through the image processor 130 that processes the current frame MI_n. In this case, in a state in which the frame buffer 120 stores the previous frame MI_n−1 of the moving image, the frame buffer 120 may provide the previous frame MI_n−1 to the motion processor 140 in synchronization with the current frame MI_n. The dotted line in FIG. 1 indicates a transfer path of the previous frame MI_n−1 stored in the frame buffer 120. The frame buffer 120 stores the current frame MI_n output from the image processor 130 so that the previous frame MI_n−1 can be supplied to the motion processor 140. The frame buffer 120 may supply the current frame MI_n to the motion processor 140 in synchronization with a cycle in which a next frame MI_n+1 is output from the image processor 130 to the motion processor 140.

The image processor 130 performs an operation for improving the quality of a moving image or a still image. The image processor 130 performs processing for improving the quality of an image with regard to respective pixel data included in frame data of the moving image or the still image. The image processor 130 may perform various image enhancement operations for processing pixel data in a pipeline manner. The image processor 130 may include, for example, a pixel data processing circuit, a pre-processing circuit, a gating circuit, etc.

The motion processor 140 may be a processor or an intellectual property (IP) block that removes noise such as, for example, afterimage or motion blur, occurring in a moving image on a liquid crystal display (LCD) or an organic light-emitting diode (OLED). For example, the motion processor 140 may compensate for the motion blur that occurs when an image of the previous frame MI_n−1 and an image of the current frame MI_n overlap each other in a user's eyes in the case in which a frame is changed. To compensate for the motion blur, a difference value between the current frame MI_n and the previous frame MI_n−1 may be calculated, and then an interpolation frame that is generated based on the calculated difference value may be added. The motion processor 140 may perform various motion compensation operations as well as the motion blur compensation operation. In addition, the motion processor 140 may perform a motion vector estimation operation. The current frame MI_n and the previous frame MI_n−1 are used to perform the motion compensation operation in the moving image mode. Similarly, the current frame MI_n and the previous frame MI_n−1 may be used to perform the motion vector estimation operation. According to an exemplary embodiment, the previous frame MI_n−1 processed by the image processor 130 may be stored in the frame buffer 120.

The driver 150 converts a moving image provided from the motion processor 140 or a still image provided from the image processor 130 into a driving signal for displaying the image in a display. For example, the driver 150 may convert a moving image or a still image into a driving signal for driving source lines of the display. Alternatively, the driver 150 may convert a moving image or a still image into a driving signal for driving gate lines of the display. In addition, the driver 150 may further include a timing controller that converts a data format of a moving image or a still image, and transfers the moving image or still image of the converted data format. It is to be understood that a configuration of the driver 150 may be changed according to various device combinations so as to be suitable for a device characteristic.

The controller 160 controls the frame buffer 120, the image processor 130, and the motion processor 140 based on a mode of image data provided from the receiver 110. When the mode "Mode" corresponding to a still image is received, the controller 160 allows the frame buffer 120 to store the still image SI that the receiver 110 outputs. The controller 160 may control the frame buffer 120 such that the stored still image is output to the image processor 130 at a frame frequency FF.

When the mode "Mode" corresponding to a moving image is received, the controller 160 allows the image processor 130 to receive and process the current frame MI_n of the moving image that the receiver 110 outputs. The controller 160 may control the frame buffer 120 such that the previous frame MI_n−1 is provided to the motion processor 140 in synchronization with the current frame MI_n provided to the motion processor 140. For example, the frame buffer 120 is controlled such that the previous frame MI_n−1 is also output to the motion processor 140 in synchronization with a cycle in which the current frame MI_n processed by the image processor 130 is transferred to the motion processor 140. In addition, after the previous frame MI_n−1 is transferred to the motion processor 140, the controller 160 may overwrite the previous frame MI_n−1 stored in the frame buffer 120 with the current frame MI_n.

As described above, the display driver circuit 100 according to an exemplary embodiment includes the frame buffer 120 that stores the previous frame MI_n−1 output from the image processor 130 in the moving image mode. The frame buffer 120 further stores the still image SI transferred from the receiver 110 in the still image mode. Accordingly, since the frame buffer 120 is used to store the previous frame MI_n−1 for motion compensation in the moving image mode, exemplary embodiments provide the display driver circuit 100 that is capable of improving the quality of reproduction of a moving image without an additional memory resource.

Figure 2:
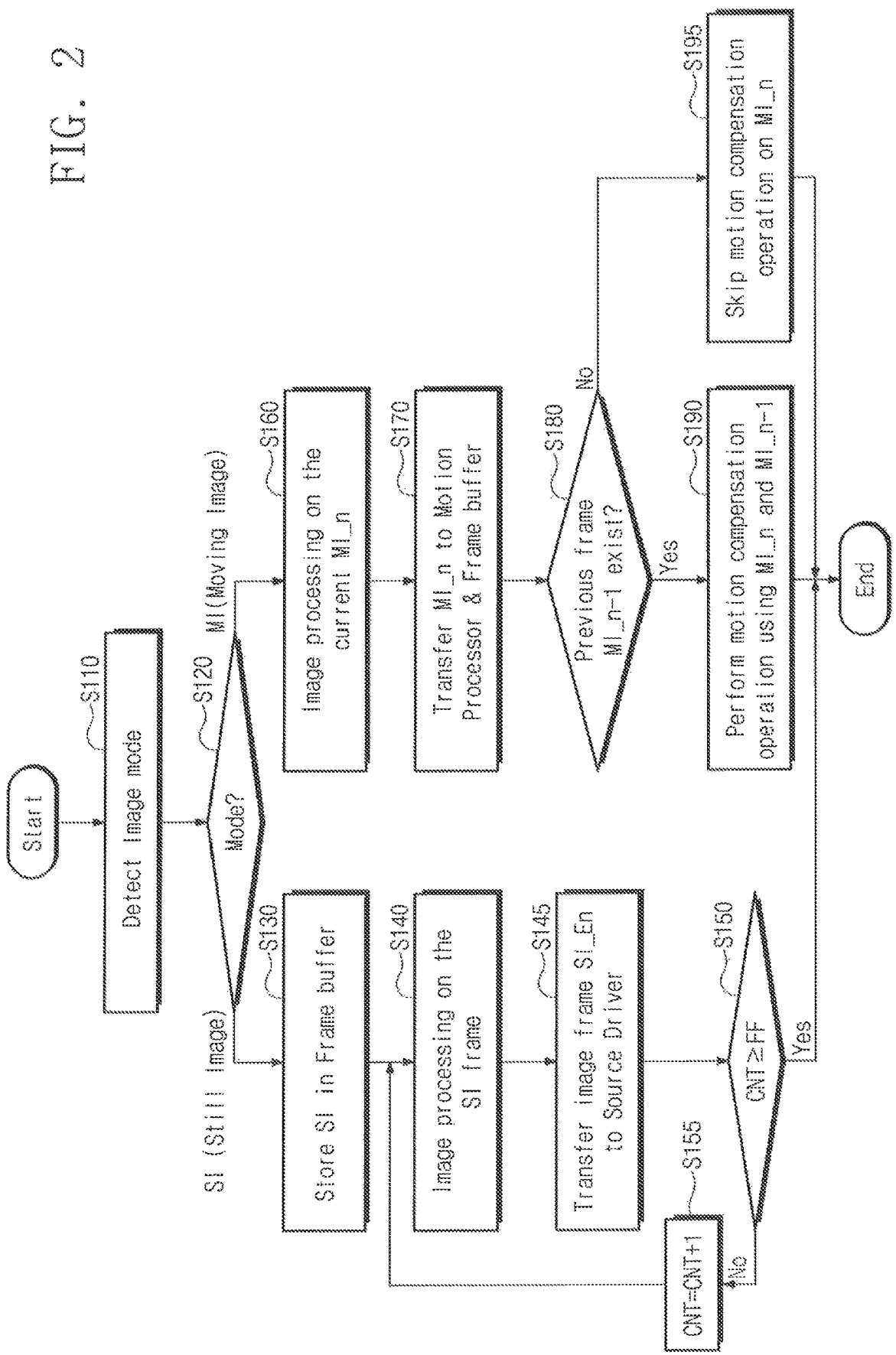
FIG. 2 is a flowchart illustrating an operating method of the display driver circuit of FIG. 1.

FIG. 2 is a flowchart illustrating an operating method of the display driver circuit of FIG. 1.

Referring to FIGS. 1 and 2, the frame buffer 120 may be used to store the still image SI or the previous frame MI_n−1 processed by the image processor 130, based on a mode of an image.

In operation S110, the receiver 110 may detect the mode "Mode" of the image data IMG_in provided from the host. The mode "Mode" indicates whether the image data IMG_in is associated with a moving image or a still image. The receiver 110 may be provided with the mode "Mode" of the input image data IMG_in through a command or a control signal from the host. When the mode "Mode" is detected, the receiver 110 may transfer a result of the detection to the controller 160.

In operation S120, the controller 160 determines a transfer path of the image data IMG_in based on the mode "Mode" provided from the receiver 110. When the mode "Mode" of the image data IMG_in corresponds to the still image mode, the procedure proceeds to operation S130 for storing the still image SI in the frame buffer 120. In contrast, when the mode "Mode" of the image data IMG_in corresponds to the moving image mode, the procedure proceeds to operation S160 for processing a moving image.

In operation S130, the controller 160 stores a current still image SI input through the receiver 110 in the frame buffer 120.

In operation S140, the controller 160 allows the image processor 130 to perform the image enhancement operation on the still image SI stored in the frame buffer 120. For example, the image processor 130 may be provided with the still image SI stored in the frame buffer 120 and may perform color correction, gamma correction, edge enhancement, color space conversion, white balancing, etc. The image enhancement operations are not limited to the above examples, and various image enhancement operations may be added or omitted. That is, in the still image mode, the still image SI received by the receiver 110 may be transferred to and stored in the frame buffer 120. Once stored in the frame buffer 120, the still image SI may then be transferred to the image processor 130, and the image processor 130 may perform an image enhancement operation on the still image SI.

In operation S145, the controller 160 may control the image processor 130 such that a still image SI_En processed by the image processor 130 is output to the driver 150. In this case, the enhanced still image SI_En may be output as the driving signal IMG_out for driving a display by the driver 150.

In operation S150, the controller 160 may determine whether the number of times CNT that the current still image SI stored in the frame buffer 120 is displayed in the display reaches the given frame frequency FF. When the number of times CNT that the enhanced still image SI_En is displayed in the display does not reach the frame frequency FF (No), the procedure proceeds to operation S155. In operation S155, the number of times CNT that the still image SI_En is displayed increases. The procedure then proceeds to operation S140. When the number of times CNT that the enhanced still image SI_En is displayed in the display reaches the frame frequency FF (Yes), the operation of the display driver circuit 100 associated with the still image SI ends. A new still image SI may then be input to the frame buffer 120.

In operation S160, the controller 160 allows the image processor 130 to perform the image enhancement operation on the current frame MI_n of a moving image input through the receiver 110. For example, the image processor 130 may be provided with the current frame MI_n of the moving image transferred from the receiver 110 without passing through the frame buffer 120, and may perform color correction, gamma correction, edge enhancement, white balancing, etc. on the provided current frame MI_n. That is, in the moving image mode, the image processor 130 may receive the current frame MI_n of the moving image directly from the receiver 110, and may perform an image enhancement operation on the received current frame MI_n.

In operation S170, the current frame MI_n of the moving image that is processed by the image processor 130 may be transferred to the motion processor 140 and the frame buffer 120.

In operation S180, whether to perform the motion compensation operation may be determined according to whether the previous frame MI_n−1 is present in the frame buffer 120 in the moving image mode. For example, when the previous frame MI_n−1 of the input current frame MI_n is present in the frame buffer 120 (Yes), the procedure proceeds to operation S190. In contrast, when the previous frame MI_n−1 is absent from the frame buffer 120 (No), the procedure proceeds to operation S195. This case corresponds to the case in which the current frame MI_n is frame data that are input for the first time in the moving image mode.

In operation S190, the motion processor 140 may perform the motion compensation operation by using the previous frame MI_n−1 provided from the frame buffer 120 and the current frame MI_n output from the image processor 130. The moving image data that are processed by the motion processor 140 may be output as the driving signal IMG_out for driving a display through the driver 150.

In operation S195, the motion compensation operation of the motion processor 140 may be skipped because the previous frame MI_n−1 does not exist. For example, the current frame MI_n may be converted into the driving signal IMG_out without the motion compensation operation.

A function of the frame buffer 120 that is used to store a reference frame for motion compensation even in the moving image mode is briefly described above. The frame buffer 120 may provide a memory function of storing the previous frame MI_n−1 that, in the moving image mode, is processed of the image processor 130 and is then backed up. According to the processing manner of an exemplary embodiment, the display driver circuit 100 may be implemented without an additional memory that would otherwise be necessary to perform the motion compensation operation on moving image data. That is, in a conventional display driver circuit, an additional memory is needed to perform motion compensation operation on moving image data. In contrast, in exemplary embodiments of the present invention, since the display driver circuit 100 is configured to use the frame buffer 120 to store a reference frame for motion compensation, an additional memory is not required. As a result, the chip size, power consumption, and manufacturing cost of the display driver circuit 100 may be decreased.

Figure 3:
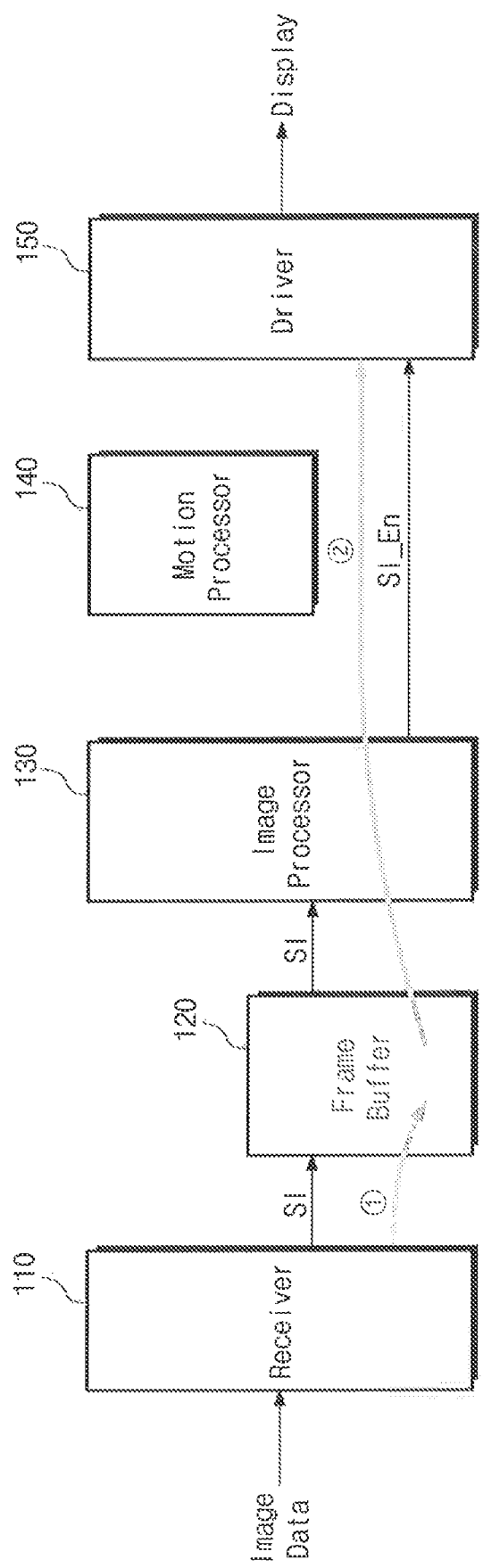
FIG. 3 is a block diagram illustrating a path through which a still image is processed.

FIG. 3 is a block diagram illustrating a path through which the still image SI is processed. FIG. 3 is described with reference to FIG. 2.

Referring to FIGS. 2 and 3, the still image SI is transferred to the image processor 130 through the frame buffer 120 and is then transferred from the image processor 130 to the driver 150.

When image data IMG_in corresponding to the still image SI are transferred to the receiver 110, the still image SI output from the receiver 110 is primarily stored in the frame buffer 120. This data path is illustrated along an arrow marked by ①.

A path through which the still image SI stored in the frame buffer 120 is processed is illustrated along an arrow marked by ②. For example, the still image SI stored in the frame buffer 120 may be repeatedly transferred along the processing path ② as much as the number of times corresponding to the given frame frequency FF. First, the still image SI stored in the frame buffer 120 is processed according to the image enhancement operation that is performed by the image processor 130. The enhanced still image SI_En that is output from the image processor 130 may be provided to the driver 150 so as to be output as the driving signal IMG_out for driving the display. According to exemplary embodiments, the processing path ② does not pass through the motion processor 140, since motion processing is not performed on the still image SI. The processing that is performed along the path ② may be repeated as much as the number of times corresponding to the frame frequency FF.

According to exemplary embodiments, the display driver circuit 100 for displaying the still image SI may include the frame buffer 120 corresponding to one frame size of the still image SI, thus ensuring that the frame buffer 120 is large enough to store the still image SI.

Figure 4:
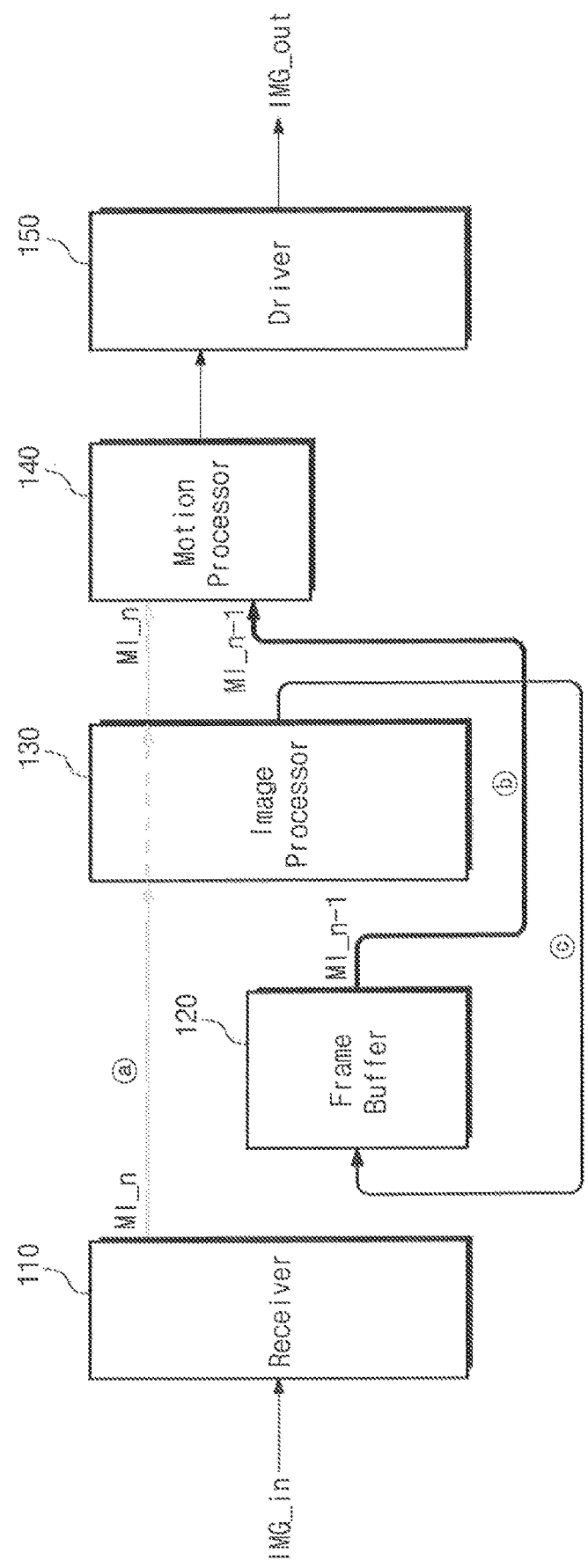
FIG. 4 is a block diagram illustrating a path where a moving image is processed, which is described with reference to FIG. 2.

FIG. 4 is a block diagram illustrating a path through which a moving image is processed. FIG. 4 is described with reference to FIG. 2.

Referring to FIGS. 2 and 4, the current frame MI_n of a moving image is transferred to the motion processor 140 through the receiver 110 and the image processor 130, and the previous frame MI_n−1 that is stored in the frame buffer 120 is transferred to the motion processor 140 in synchronization with the transfer of the current frame MI_n. Here, it is assumed that the previous frame MI_n−1 is previously stored in the frame buffer 120.

When the image data IMG_in corresponding to the moving image MI_n is transferred to the receiver 110, the receiver 110 first transfers the current frame MI_n to the image processor 130. The image processor 130 performs the image enhancement operation on the current frame MI_n. Data corresponding to the current frame MI_n output from the image processor 130 are transferred to the motion processor 140. This data path of the current frame MI_n is illustrated along an arrow marked by ⓐ.

In addition, the previous frame MI_n−1 stored in the frame buffer 120 is transferred to the motion processor 140 in synchronization with the event that the current frame MI_n arrives at the motion processor 140. This data path of the previous frame MI_n−1 is illustrated along an arrow marked by ⓑ.

The current frame MI_n output from the image processor 130 may be stored in the frame buffer 120 for motion compensation of the next frame MI_n+1 to be performed later. Compression encoding may be performed in this process. This data path through which the current frame MI_n is transferred to the frame buffer 120 is illustrated along an arrow marked by ⓒ.

In the case in which the current frame MI_n input in the moving image mode is data that are input for the first time after a mode switches from the still image mode to the moving image mode, a still image may have been stored in the frame buffer 120, or the previous MI_n−1 may not exist. In this case, the current frame MI_n input for the first time in the moving image mode may be displayed in the display without the motion compensation operation. The current frame MI_n input for the first time may be stored in the frame buffer 120 and may be used in the motion compensation operation of the next frame MI_n+1 following the current frame MI_n.

In the moving image mode, the display driver circuit 100 utilizes the frame buffer 120 to provide the previous frame MI_n−1 as a reference frame for motion compensation. Thus, according to exemplary embodiments, resources may be efficiently utilized by using the frame buffer 120, which is already provided in the display driver circuit 100 for the still image SI, as a memory for also storing the previous frame MI_n−1 for the purpose of motion compensation.

Figure 5:
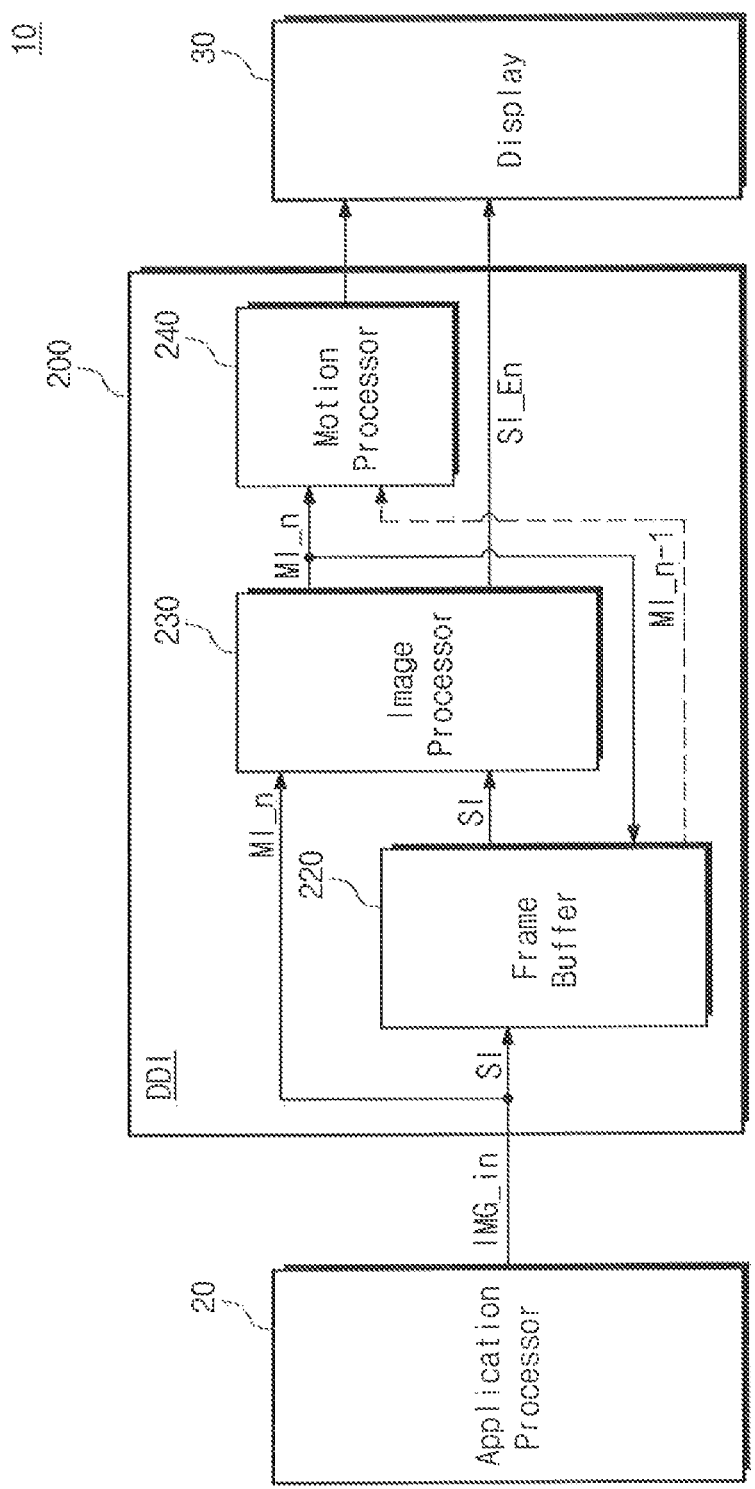
FIG. 5 is a block diagram illustrating a mobile device according to an exemplary embodiment of the inventive concept.

FIG. 5 is a block diagram illustrating a mobile device according to an exemplary embodiment of the inventive concept.

Referring to FIG. 5, a mobile device 10 may include an application processor 20, a display 30, and a display driver circuit 200.

The application processor 20 generates image data to be displayed in the display 30. The application processor 20 may generate image data such as a still image or a moving image, and may transfer the image data to the display driver circuit 200. In this case, a mode of an image such as a still image or a moving image may be provided together with the image data.

The application processor 20 transfers the image data IMG_in corresponding to a moving image or a still image to be displayed in the display 30 to the display driver circuit 200. The application processor 20 may transfer image data to the display driver circuit 200 through, for example, a high speed serial interface (HiSSI) such as a mobile industry processor interface (MIPI). The application processor 20 may provide control information to the display driver circuit 200 through, for example, a low speed serial interface (LoSSI) such as a serial peripheral interface (SPI) or an inter-integrated circuit ($I^2C$).

The display driver circuit 200 and the components included therein, as illustrated in FIG. 5, may correspond to the display driver circuit 100 and the components included therein, as illustrated in FIG. 1. For convenience of explanation, a further description of elements and technical aspects previously described may be omitted.

The display driver circuit 200 processes the image data IMG_in from the application processor 20 and transfers the processed data to the display 30. In the case in which the input image data IMG_in correspond to a moving image, the display driver circuit 200 may perform the motion compensation operation that uses the current frame MI_n and the previous frame MI_n−1 stored in the frame buffer 120. In contrast, in the case in which the input image data IMG_in correspond to the still image SI, the display driver circuit 200 stores the still image SI in the frame buffer 120. Subsequently, in the display driver circuit 200, an image processor 230 may apply the image enhancement operation to the still image SI stored in a frame buffer 220, and a result of applying the image enhancement operation to the still image SI may be output to the display 30. That is, the display driver circuit 200 uses the frame buffer 220 as a buffer memory of the still image SI.

In addition, the frame buffer 220 may be used as a memory for storing the previous frame MI_n−1 for motion compensation that is performed by a motion processor 240, in the moving image mode. The previous frame MI_n−1 stored in the frame buffer 220 may be provided to the motion processor 140 in synchronization with a cycle in which the current frame MI_n arrives at the motion processor 140. According to the above description, in exemplary embodiments, the quality of reproduction of a moving image may be secured without the need of an additional memory to perform the motion compensation operation on the moving image.

The display 30 displays an image based on output image data IMG_out provided from the display driver circuit 200. In general, an LCD or an OLED Small Mask Scanning (OLED SMS) is vulnerable to noise such as motion blur. The display driver circuit 200 according to exemplary embodiments performs the motion compensation operation without an increase in a frame memory (e.g., without the need for an additional memory). Thus, a low-power, low-cost mobile device 10 may be implemented.

Figure 6:
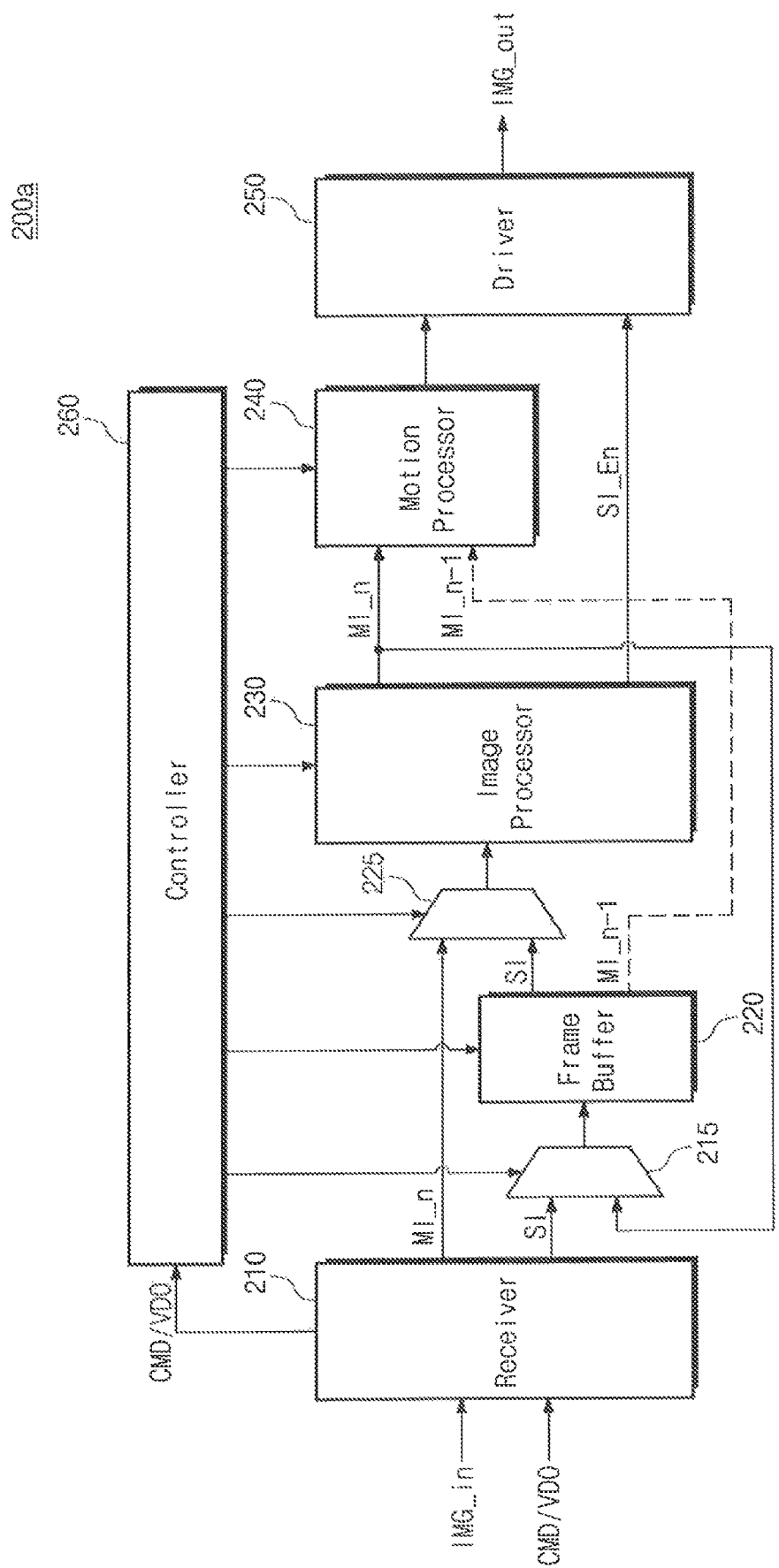
FIG. 6 is a block diagram illustrating an exemplary embodiment of a display driver circuit illustrated in FIG. 5.

FIG. 6 is a block diagram illustrating an exemplary embodiment of the display driver circuit illustrated in FIG. 5.

Referring to FIG. 6, a display driver circuit 200a may include a receiver 210, the frame buffer 220, the image processor 230, the motion processor 240, a driver 250, and multiplexers 215 and 225. Here, functions of the image processor 230, the motion processor 240, and the driver 250 are substantially the same as the functions of those described with reference to FIG. 1. Thus, for convenience of explanation, a further description thereof will be omitted.

The receiver 210 receives the image data IMG_in and a mode CMD/VDO of the image data IMG_in from the application processor 20 (refer to FIG. 5). For example, the receiver 210 may be provided with a command mode CMD or a video mode VDO corresponding to the image data IMG_in from the application processor 20. The receiver 210 transfers information about the mode CMD/VDO provided from the application processor 20 to a controller 260.

In addition, the receiver 210 transfers the input image data IMG_in to the frame buffer 220 or the image processor 230 based on the mode CMD/VDO. For example, the receiver 210 recognizes the image data IMG_in transferred in the video mode VDO as the moving image MI_n and transfers the moving image MI_n to the image processor 230. In contrast, the receiver 210 recognizes the image data IMG_in transferred in the command mode CMD as the still image SI and transfers the still image SI to the frame buffer 220. The controller 260 may control the multiplexer 215 based on the mode CMD/VDO. For example, in the command mode CMD, the multiplexer 215 may transfer the still image SI to the frame buffer 220, and the multiplexer 225 may transfer the still image SI to the image processor 230.

The frame buffer 220 stores the previous frame MI_n−1 processed by the image processor 230 in the video mode VDO. The frame buffer 220 may provide the previous frame MI_n−1 to the motion processor 240 as a reference for motion compensation at a time when the current frame MI_n is transferred to the motion processor 240.

The controller 260 may control operations of the multiplexers 215 and 225, the frame buffer 220, the image processor 230, and the motion processor 240 based on a mode of the input image data IMG_in. For example, in the video mode VDO, the controller 260 allows the first multiplexer 215 to select a moving image frame processed by the image processor 230, not the still image SI. Also, in the video mode VDO, the controller 260 allows the second multiplexer 225 to select a moving image frame MI_n transferred from the receiver 210, not the still image SI output from the frame buffer 220.

In contrast, in the command mode CMD, the controller 260 may allow the first multiplexer 215 to select the still image SI transferred from the receiver 210, not a moving image frame processed by the image processor 230. In the video mode VDO, the controller 260 allows the second multiplexer 225 to select the still image SI output from the frame buffer 220, not the moving image frame MI_n transferred from the receiver 210.

In the video mode VDO, the controller 260 may control a time when the current frame MI_n arrives at the motion processor 240 and a time when the previous frame MI_n−1 is output from the frame buffer 220 to the motion processor 240. According to exemplary embodiments, various forms of delay circuits may be used such that the current frame MI_n and the previous frame MI_n−1 are simultaneously transferred to the motion processor 240.

In an exemplary embodiment, the display driver circuit 200a may use the frame buffer 220, which may have a restricted size, as a memory that stores a previous frame for motion compensation of a moving image. Accordingly, the low-power, low-cost display driver circuit 200a that secures the quality of reproduction of a moving image may be implemented by efficiently using a limited memory resource.

Figure 7:
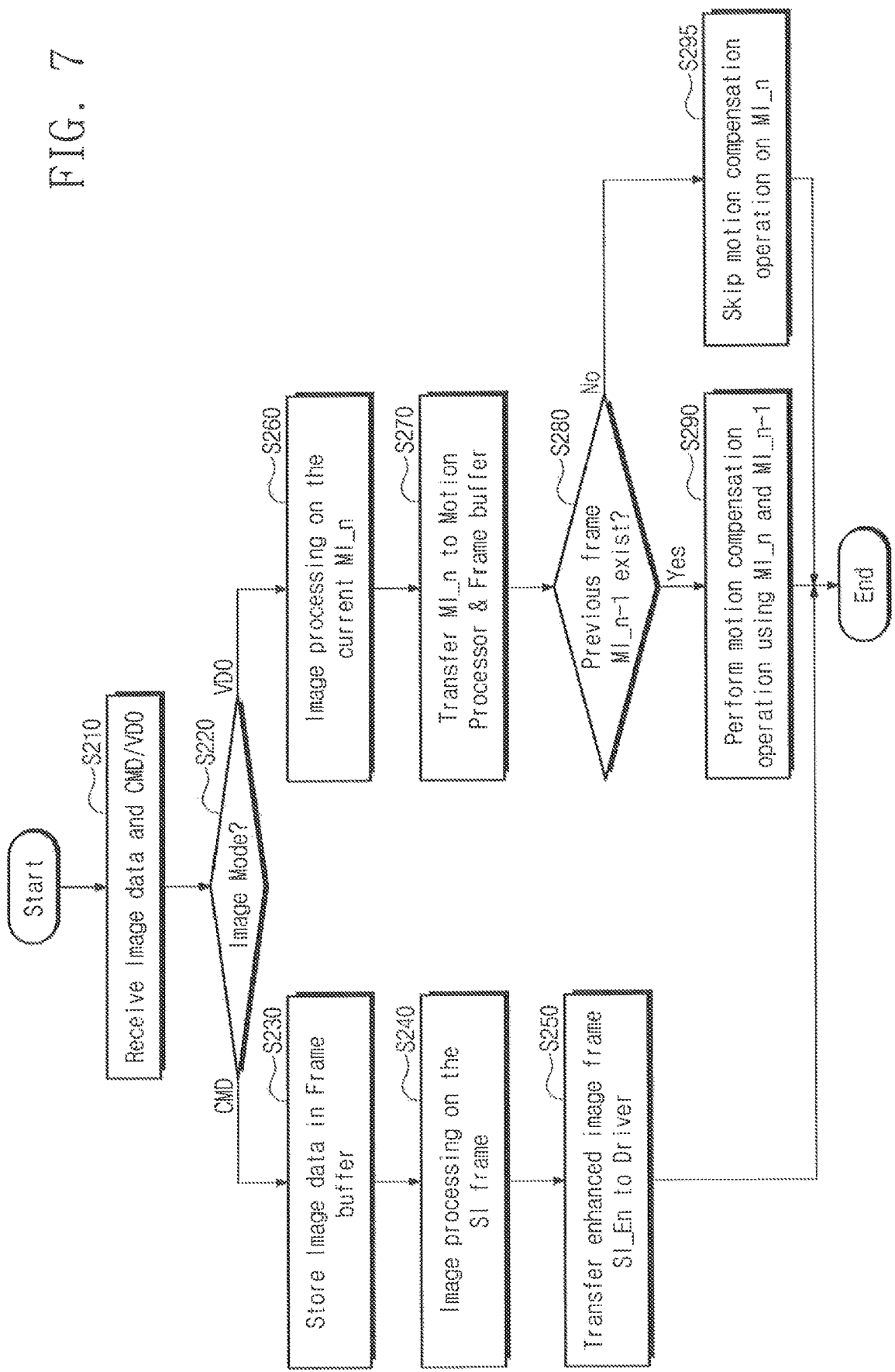
FIG. 7 is a flowchart illustrating an operation of the display driver circuit of FIG. 6.

FIG. 7 is a flowchart illustrating an operation of the display driver circuit 200a of FIG. 6.

Referring to FIGS. 6 and 7, the frame buffer 220 may store frame data in each of the moving image mode and the still image mode.

In operation S210, the receiver 210 may be provided with the image data IMG_in and the mode CMD/VDO from the application processor 20. The mode CMD/VDO indicates whether the image data IMG_in is a moving image (e.g., corresponding to VDO) or a still image (e.g., corresponding to CMD). The receiver 210 may be provided with the mode "Mode" of the image data IMG_in through a command or a control signal from the application processor 20. When the mode CMD/VDO is detected, the receiver 210 may transfer a result of the detection to the controller 260.

In operation S220, the controller 260 determines a transfer path of the image data IMG_in based on the mode CMD/VDO provided from the receiver 210. When the mode CMD/VDO of the image data IMG_in corresponds to the command mode CMD, the procedure proceeds to operation S230 for storing the still image SI in the frame buffer 220. In contrast, when the mode CMD/VDO of the image data IMG_in corresponds to the video mode VDO, the procedure proceeds to operation S260 for processing a moving image.

In operation S230, the controller 260 stores the still image SI input through the receiver 210 in the frame buffer 220. In an exemplary embodiment, the size of the frame buffer 220 is large enough to store one frame image or one compressed frame image.

In operation S240, the controller 260 allows the image processor 230 to perform the image enhancement operation on the still image SI stored in the frame buffer 220. For example, the image processor 230 may be provided with the still image SI stored in the frame buffer 220, and may perform, for example, color correction, gamma correction, edge enhancement, color space conversion, white balancing, etc. It is to be understood that the image enhancement operations are not limited to the above examples, and various image enhancement operations may be added or omitted.

In operation S250, the controller 260 may control the image processor 230 such that the still image SI_En processed by the image processor 230 is output to the driver 250. In this case, the enhanced still image SI_En may be displayed by the driver 250. Here, it is described with reference to FIG. 2 that the still image SI stored in the frame buffer 220 may be processed by the image processor 230 as much as the number of times corresponding to the frame frequency FF. For convenience of explanation, a further description of this procedure of processing the still image SI will be omitted below.

In operation S260, the controller 260 allows the image processor 230 to perform the image enhancement operation on the current frame MI_n of a moving image input through the receiver 210. For example, the image processor 230 may be provided with the current frame MI_n of the moving image from the receiver 210 without passing through the frame buffer 220, and may perform, for example, color correction, gamma correction, edge enhancement, white balancing, etc. on the provided current frame MI_n.

In operation S270, the current frame MI_n of the moving image that are processed by the image processor 230 may be transferred to the motion processor 240 and the frame buffer 220.

In operation S280, whether to perform the motion compensation operation may be determined according to whether the previous frame MI_n−1 of the current frame MI_n of the moving image is present in the frame buffer 220. For example, when the previous frame MI_n−1 of the current frame MI_n is present in the frame buffer 220 (Yes), the procedure proceeds to operation S290. In contrast, when the previous frame MI_n−1 of the current frame MI_n is absent from the frame buffer 220 (No), the procedure proceeds to operation S295.

In operation S290, the motion processor 240 may perform the motion compensation operation by using the previous frame MI_n−1 provided from the frame buffer 220 and the current frame MI_n output from the image processor 230. The moving image data that are processed by the motion processor 240 may be displayed in a display by the driver 250.

In operation S295, the motion compensation operation of the motion processor 240 is skipped because the previous frame MI_n−1 does not exist. For example, the current frame MI_n may be displayed without the motion compensation operation having been performed.

As described above, in an exemplary embodiment, the display driver circuit 200*a* includes the frame buffer 220 that stores the previous frame MI_n−1 in the moving image mode or the video mode VDO, and stores the still image SI in the still image mode or the command mode CMD. Since the frame buffer 220 is used in both the still image mode and the moving image mode, the display driver circuit 200*a* capable of driving a moving image and a still image without the need to implement an additional resource such as, for example, a separate external memory or a separate internal memory, may be implemented.

Figure 8:
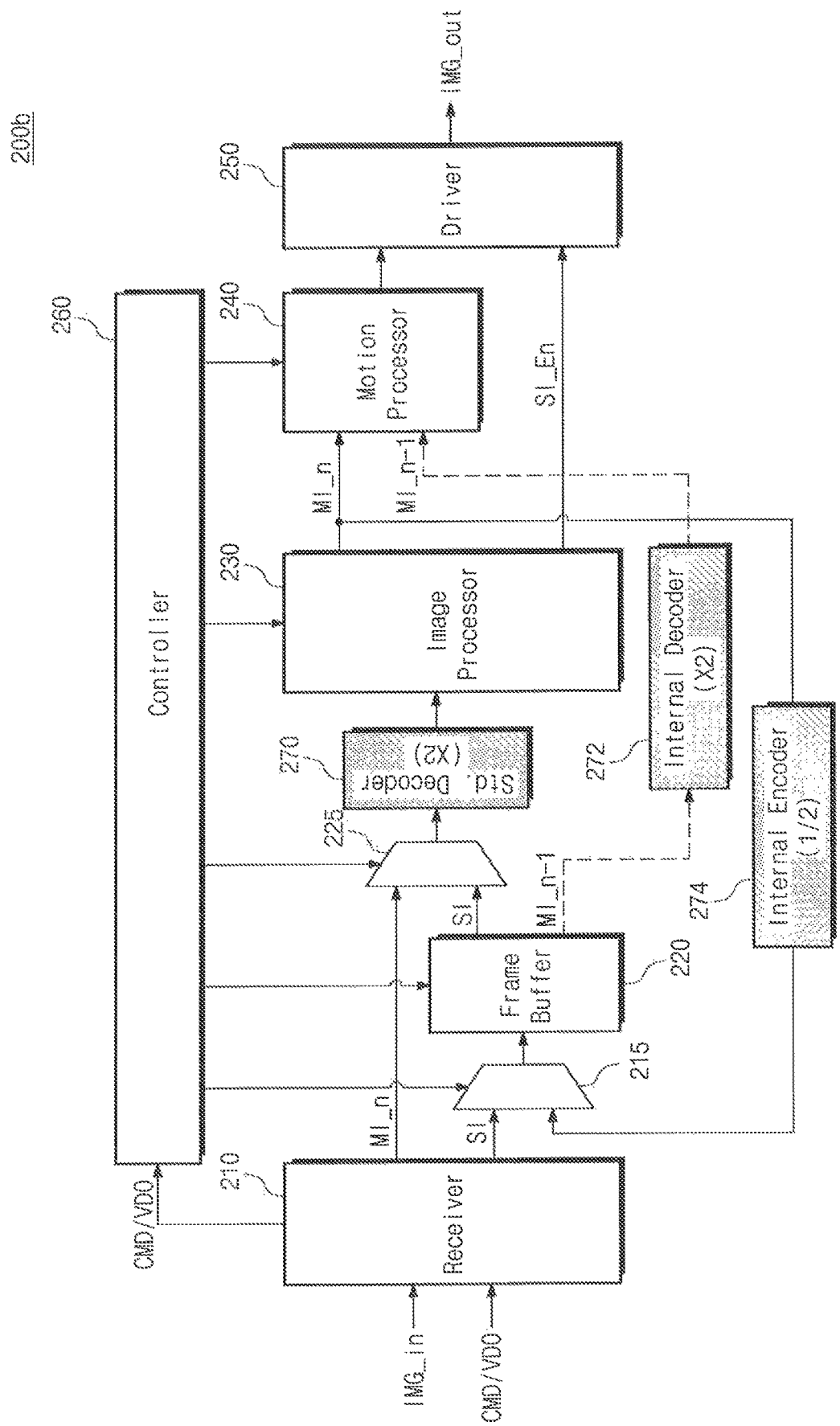
FIG. 8 is a block diagram illustrating an exemplary embodiment of a display driver circuit illustrated in FIG. 5.

FIG. 8 is a block diagram illustrating an exemplary embodiment of the display driver circuit 200 illustrated in FIG. 5.

Referring to FIGS. 5 and 8, a display driver circuit 200*b* may include the receiver 210, the frame buffer 220, the image processor 230, the motion processor 240, the driver 250, the multiplexers 215 and 225, a standard decoder 270, an internal decoder 272, and an internal encoder 274. Here, functions of the image processor 230, the motion processor 240, and the driver 250 are substantially the same as the functions of those described with reference to FIGS. 1 and 6. Thus, for convenience of explanation, a further description thereof will be omitted.

The receiver 210 receives the image data IMG_in and the mode CMD/VDO of the image data IMG_in from the application processor 20. The receiver 210 may be provided with the command mode CMD or the video mode VDO corresponding to the image data IMG_in from the application processor 20. The receiver 210 transfers the mode CMD/VDO provided from the application processor 20 to the controller 260. For example, the application processor 20 may transfer compressed image data IMG_in. For example, in an exemplary embodiment, it is assumed that the application processor 20 provides the image data IMG_in compression-encoded with a compression ratio of 1/2. An operation of the display driver circuit 200*b* in each of the still image mode and the moving image mode will be described below.

First, in the case in which the image data IMG_in compressed with the compression ratio of 1/2 is transferred to the receiver 210 in the command mode CMD (or the still image mode), each of the multiplexers 215 and 225 selects the still image SI. In this case, the still image SI compressed with the compression ratio of 1/2 is transferred to the frame buffer 220 through the first multiplexer 215, and is then transferred to the standard decoder 270 through the second multiplexer 225. The standard decoder 270 may decompress the still image SI compressed by the application processor 20 with the compression ratio of 1/2. The decompressed still image SI is transferred to the image processor 230. The image processor 230 may output the enhanced still image SI_En by performing an image enhancement operation on the decompressed still image SI. The driver 250 may output the driving signal IMG_out for driving the display based on the enhanced still image SI_En.

In contrast, the case in which the image data IMG_in compressed with the compression ratio of 1/2 is transferred to the receiver 210 in the video mode VDO (or the moving image mode) will be described below. According to the above case, the second multiplexer 225 may be configured to select the current frame MI_n of a moving image, and the first multiplexer 215 may be configured to select a fed-back moving image output from the internal encoder 274. In this condition, the input current frame MI_n is transferred to the standard decoder 270 through the second multiplexer 225. The standard decoder 270 decompresses the compressed current frame MI_n and transfers the decompressed current frame MI_n to the image processor 230. The image processor 230 performs an operation for enhancing the quality of the decompressed current frame MI_n. The decompressed current frame MI_n output from the image processor 230 is transferred to the motion processor 240 and the internal encoder 274.

The internal encoder 274 performs compression encoding on the decompressed current frame MI_n output from the image processor 230 with the compression ratio of 1/2, and transfers a result of the compression encoding to the first multiplexer 215. The compressed current frame MI_n is again transferred to the frame buffer 220 through the first multiplexer 215.

In addition, the previous frame MI_n−1 may also be transferred to the motion processor 240 in synchronization with a time when the current frame MI_n is transferred to the motion processor 240 for the purpose of motion compensation of a moving image. The previous frame MI_n−1 that is stored in the frame buffer 220 is in a compressed state. Accordingly, in the case in which the previous frame MI_n−1 is output from the frame buffer 220, the previous frame MI_n−1 is decompressed by the internal decoder 272, and the decompressed previous frame MI_n−1 is transferred to the motion processor 240.

Figure 9:
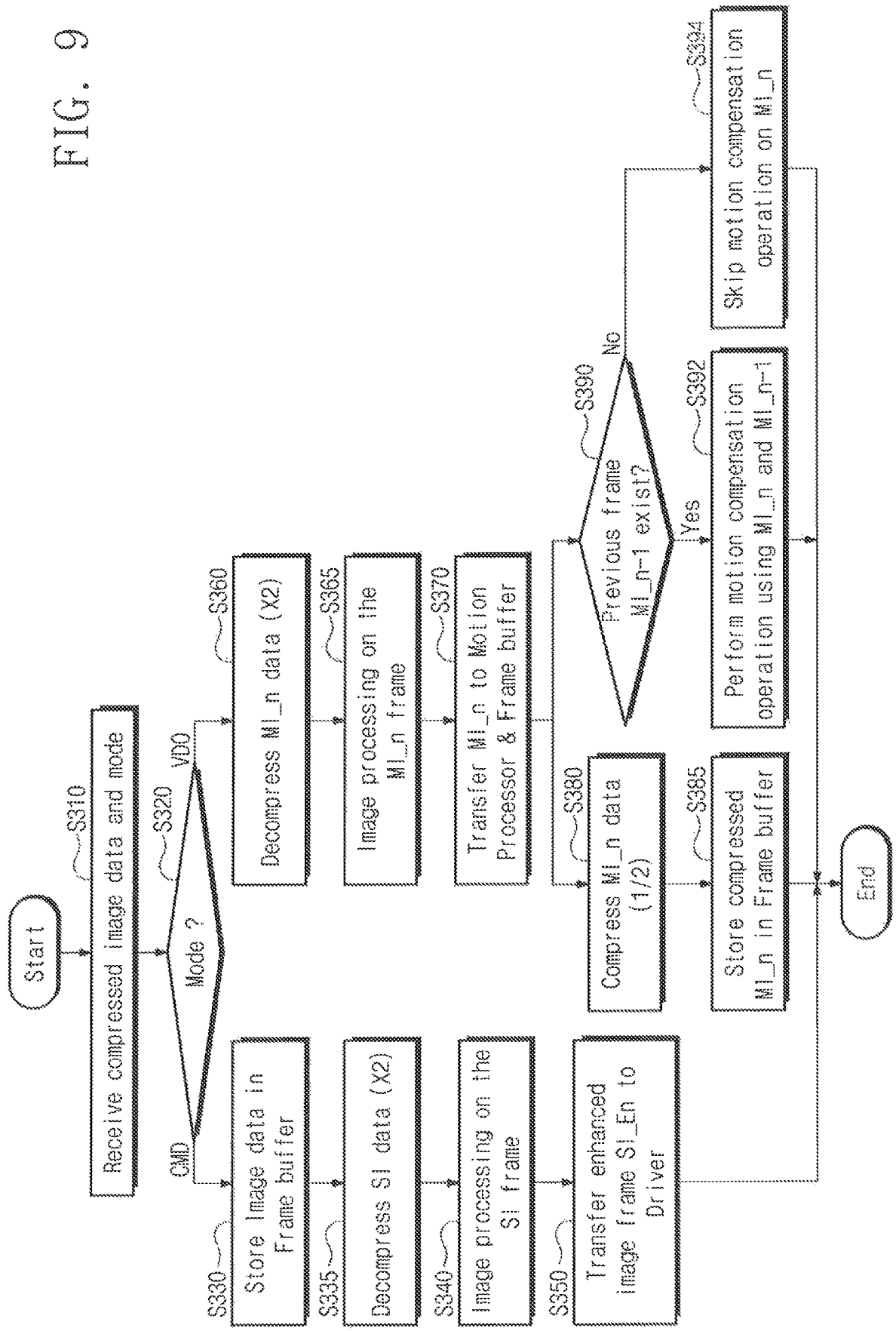
FIG. 9 is a flowchart illustrating an operation of the display driver circuit of FIG. 8.

FIG. 9 is a flowchart illustrating an operation of the display driver circuit 200b of FIG. 8.

Referring to FIGS. 8 and 9, the frame buffer 220 may store compressed image data in the moving image mode and the still image mode. Below, an operating method according to an exemplary embodiment of the inventive concept will be described with reference to the components of FIG. 8.

In operation S310, the receiver 210 may be provided with the image data IMG_in and the mode CMD/VDO from the application processor 20.

In operation S320, the controller 260 determines a transfer path of the image data IMG_in based on the mode CMD/VDO provided from the receiver 210. When the mode CMD/VDO of the image data IMG_in corresponds to the command mode CMD, the procedure proceeds to operation S330 for storing the still image SI in the frame buffer 220. In contrast, when the mode CMD/VDO of the image data IMG_in corresponds to the video mode VDO, the procedure proceeds to operation S360 for processing a moving image.

In operation S330, the controller 260 controls the first multiplexer 215 and the frame buffer 220 such that the still image SI input through the receiver 210 is stored in the frame buffer 220. The still image SI may be provided from the application processor 20 in a compressed format in which the still image SI is compressed with the compression ratio of 1/2. Accordingly, in an exemplary embodiment, it is sufficient that the memory size of the frame buffer 220 corresponds to only one compressed frame data.

In operation S335, the 1/2-compressed still image SI stored in the frame buffer 220 is transferred to the standard decoder 270. The standard decoder 270 may decode the still image SI in a manner corresponding to a compression encoding manner used in the application processor 20. The 1/2-compressed still image SI is decompressed by the standard decoder 270.

In operation S340, the image processor 230 performs an image enhancement operation on the decompressed still image SI. For example, the image processor 230 may be provided with the decompressed still image SI stored in the frame buffer 120, and may perform, for example, color correction, gamma correction, edge enhancement, color space conversion, white balancing, etc.

In operation S350, the controller 260 may control the image processor 230 such that the still image SI_En processed by the image processor 230 is output to the driver 250.

In operation S360, the current frame MI_n of a moving image that is input in a compressed state is decompressed. For example, the current frame MI_n that is compressed by the application processor 20 with the compression ratio of 1/2 is decompressed by the standard decoder 270.

In operation S365, the image processor 230 performs an image enhancement operation on the decompressed current frame MI_n of the moving image. For example, the image processor 230 may perform at least one of color correction, gamma correction, edge enhancement, color space conversion, white balancing, etc. on the decompressed still image SI.

In operation S370, the current frame MI_n that is processed by the image processor 230 is transferred to the motion processor 240 and the internal encoder 274. In the moving image mode, the current frame MI_n that is in a decompressed state is processed along two data paths. A first path through which the current frame MI_n is transferred is a path in which the current frame MI_n is stored in the frame buffer 220 such that the current frame MI_n is provided as a reference for motion compensation with the next frame MI_n+1. A second path through which the current frame MI_n is transferred is a path in which the current frame MI_n is transferred to the motion processor 240 for the purpose of performing the motion compensation operation by using the previous frame MI_n−1. The first path corresponds to operation S380 and operation S385, and the second path corresponds to operation S390, operation S392, and operation S394.

In operation S380, the internal encoder 274 again compresses the decompressed current frame MI_n for the purpose of storing the current frame MI_n in the frame buffer 220.

In operation S385, the compressed current frame MI_n is stored in the frame buffer 220 through the first multiplexer 215. Subsequently, for the purpose of the motion compensation of the next frame MI_n+1, the current frame MI_n stored in the frame buffer 220 may be decompressed by the internal decoder 272, and then, the decompressed current frame MI_n may be transferred to the motion processor 240.

In operation S390, the operation branch of the motion processor 240 is made according to whether the previous frame MI_n−1 exists in the moving image mode. Whether the previous frame MI_n−1 for the motion compensation of the current frame MI_n is present in the frame buffer 220 may be determined. The current frame MI_n may be frame data that are input for the first time after a mode switches from the still image mode to the moving image mode. In this case, the previous frame MI_n−1 corresponding to the current frame MI_n may be absent from the frame buffer 220. In this case, the procedure may proceed to operation S394. In contrast, when the previous frame MI_n−1 corresponding to the current frame MI_n exists, the procedure proceeds to operation S392.

In operation S392, the motion processor 240 performs the motion compensation operation by using the current frame MI_n and the previous frame MI_n−1. The motion compensation-completed data may be transferred to the driver 250 so as to be converted into the driving signal IMG_out for driving a display.

In operation S394, the motion compensation operation for the current frame MI_n is omitted because the previous frame MI_n−1 for the motion compensation does not exist. The motion compensation operation may be applied after at least two sequential frames of a moving image are secured, that is, after the next frame MI_n+1 is received.

Figure 10:
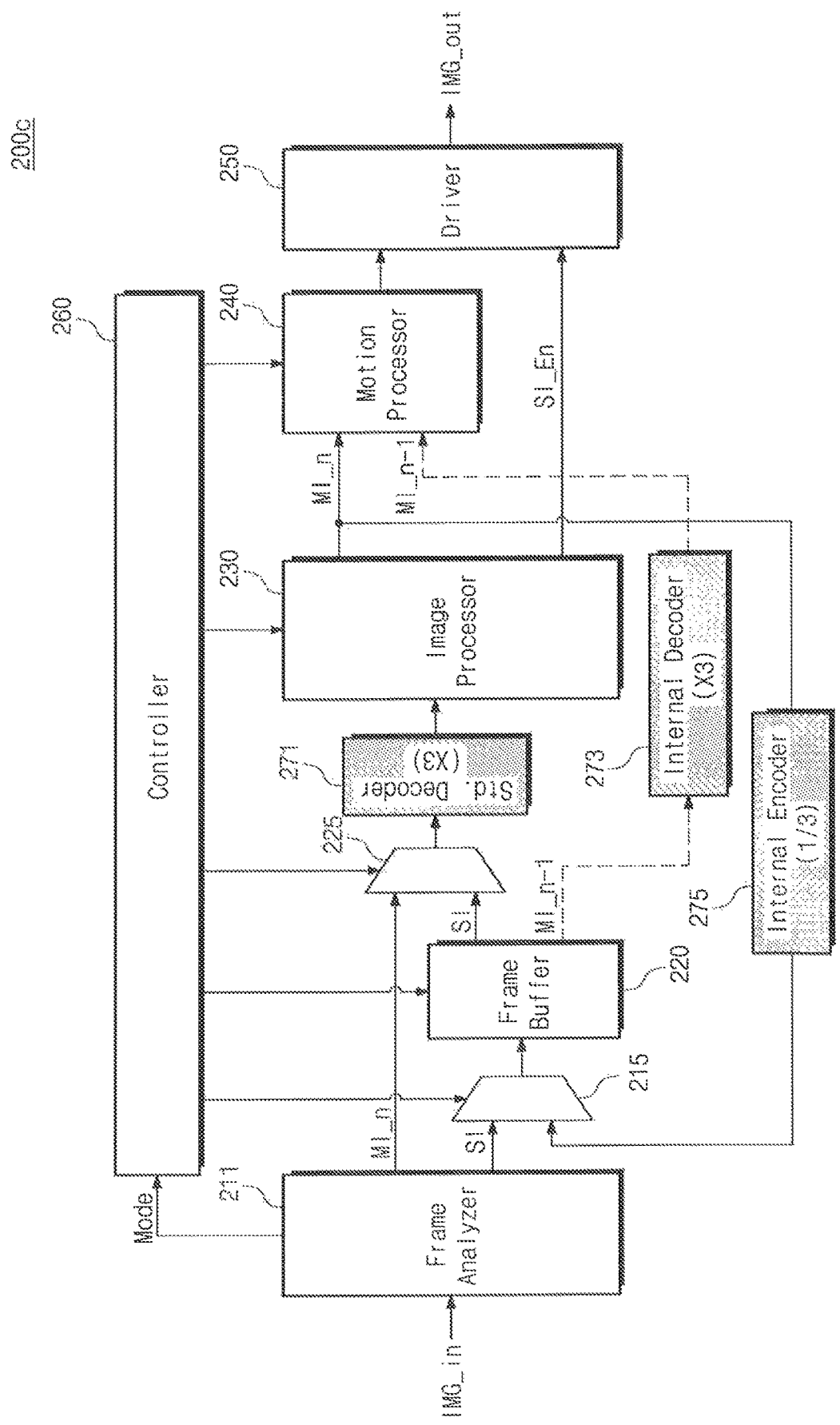
FIG. 10 is a block diagram illustrating an exemplary embodiment of the display driver circuit illustrated in FIG. 5.

FIG. 10 is a block diagram illustrating an exemplary embodiment of the display driver circuit 200 illustrated in FIG. 5.

Referring to FIG. 10, a display driver circuit 200c may identify the moving image mode and the still image mode without receiving mode information from the application processor 20, and may use the frame buffer 220 for the purpose of a corresponding mode. The display driver circuit 200c may include a frame analyzer 211, the frame buffer 220, the image processor 230, the motion processor 240, the driver 250, the multiplexers 215 and 225, a standard decoder 271, an internal decoder 273, and an internal encoder 275.

Here, a function and an operation of the display driver circuit 200c is similar to the function and the operation of the display driver circuit 200b of FIG. 8, except for the frame analyzer 211 (which replaces the receiver 210) and some operations of the controller 260. Thus, for convenience of explanation, a further description of the remaining components other than the frame analyzer 211 and the controller 260 will be omitted.

The frame analyzer 211 analyzes a pattern of the image data IMG_in provided from the application processor 20. The frame analyzer 211 may determine the mode "Mode" of the image data IMG_in based on a result of the analysis. The frame analyzer 211 may transfer the mode "Mode" of the input image data IMG_in, which is detected as the pattern analyzing result.

The controller 260 may process the image data IMG_in input later based on a moving image processing procedure or a still image processing procedure corresponding to the mode "Mode". For example, in the case in which the frame analyzer 211 determines that the input image data IMG_in correspond to a still image, the still image SI that is compressed with a compression ratio of 1/3 is stored in the frame buffer 220 and is then transferred to the standard decoder 270 through the second multiplexer 225 later. The standard decoder 271 may decompress the still image SI compressed by the application processor 20 with the compression ratio of 1/3. The decompressed still image SI is transferred to the image processor 230. The image processor 230 may output the enhanced still image SI_En by performing an image enhancement operation on the decompressed still image SI. The driver 250 may transfer a display image signal based on the enhanced still image SI_En.

In contrast, the case in which the image data IMG_in compressed with the compression ratio of 1/3 is transferred to the frame analyzer 212 in the moving image mode will be described below. According to the above case, the second multiplexer 225 may be configured to select the current frame MI_n of a moving image, and the first multiplexer 215 may be configured to select a fed-back moving image output from the internal encoder 275. In this condition, the input current frame MI_n is transferred to the standard decoder 271 through the second multiplexer 225. The standard decoder 271 decompresses the compressed current frame MI_n, and transfers the decompressed current frame MI_n to the image processor 230. The image processor 230 performs an operation for enhancing the quality of the decompressed current frame MI_n. The decompressed current frame MI_n output from the image processor 230 is transferred to the motion processor 240 and the internal encoder 275.

The internal encoder 275 performs compression encoding on the decompressed current frame MI_n output from the image processor 230 with the compression ratio of 1/3, and transfers a result of the compression encoding to the first multiplexer 215. The compressed current frame MI_n is again stored in the frame buffer 220 through the first multiplexer 215.

In addition, the previous frame MI_n−1 may also be transferred to the motion processor 240 in synchronization with a time when the current frame MI_n is transferred to the motion processor 240 for the purpose of motion compensation of a moving image. The previous frame MI_n−1 that is stored in the frame buffer 220 is in a compressed state. Accordingly, in the case in which the previous frame MI_n−1 is output from the frame buffer 220, the previous frame MI_n−1 is decompressed by the internal decoder 273, and the decompressed previous frame MI_n−1 is transferred to the motion processor 240.

Figure 11:
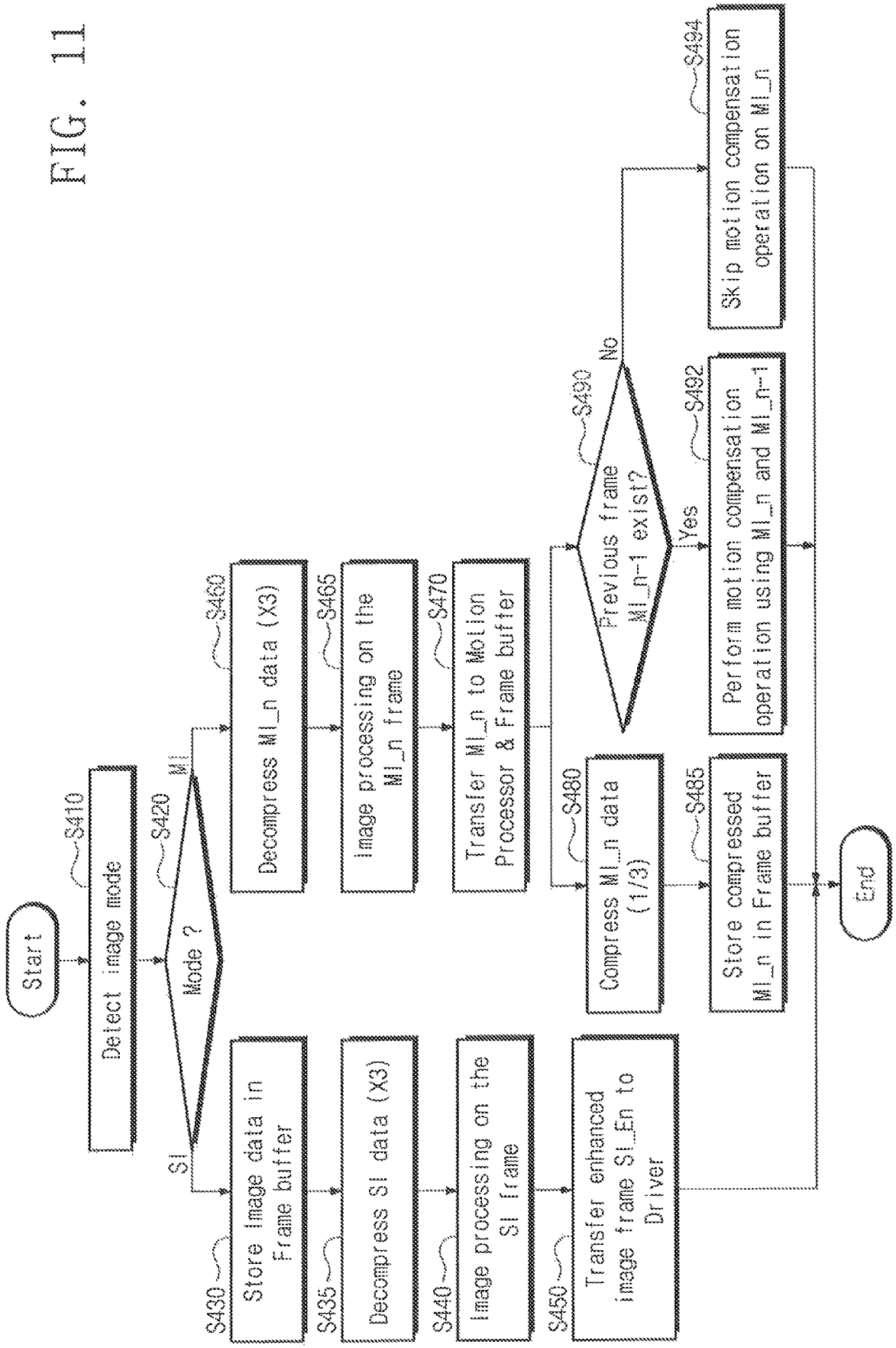
FIG. 11 is a flowchart illustrating an operation of the display driver circuit of FIG. 10.

FIG. 11 is a flowchart illustrating an operation of the display driver circuit 200c of FIG. 10.

Referring to FIGS. 10 and 11, the frame buffer 220 may store compressed image data in the moving image mode and the still image mode. Below, an operating method according to an exemplary embodiment of the inventive concept will be described with reference to the components of FIG. 10.

In operation S410, the frame analyzer 211 detects the moving image mode and the still image mode by analyzing a pattern of the image data IMG_in transferred from the application processor 20. The detected mode information Mode is provided to the controller 260.

In operation S420, the controller 260 determines a transfer path of the image data IMG_in based on the mode "Mode" provided from the receiver 210. When the mode "Mode" of the image data IMG_in corresponds to the still image mode, the procedure proceeds to operation S430 for storing the still image SI in the frame buffer 220. In contrast, when the mode "Mode" of the image data IMG_in corresponds to the moving image mode, the procedure proceeds to operation S460 for processing a moving image.

In operation S430, the controller 260 controls the first multiplexer 215 and the frame buffer 220 such that the still image SI input through the receiver 210 is stored in the frame buffer 220. The still image SI may be provided from the application processor 20 in a compressed state. Accordingly, in an exemplary embodiment, it is sufficient that the memory size of the frame buffer 220 corresponds to the size of only one compressed frame data.

In operation S435, the compressed still image SI stored in the frame buffer 220 is transferred to the standard decoder 271. The standard decoder 271 may decode the still image SI in a manner corresponding to a compression encoding manner used in the application processor 20. The compressed still image SI is decompressed by the standard decoder 271.

In operation S440, the image processor 230 performs an image enhancement operation on the decompressed still image SI. For example, the image processor 230 may be provided with the decompressed still image SI stored in the frame buffer 120, and may perform, for example, color correction, gamma correction, edge enhancement, color space conversion, white balancing, etc.

In operation S450, the controller 260 may control the image processor 230 such that the still image SI_En processed by the image processor 230 is output to the driver 250. In this case, the enhanced still image SI_En may be displayed by the driver 250.

In operation S460, the current frame MI_n of a moving image that is input in a compressed state is decompressed. For example, the current frame MI_n that is input from the application processor 20 in a compressed state is decompressed by the standard decoder 271.

In operation S465, the image processor 230 performs an image enhancement operation on the decompressed current frame MI_n of the moving image. For example, the image processor 230 may perform at least one of color correction, gamma correction, edge enhancement, color space conversion, white balancing, etc. on the decompressed still image SI.

Operations S470 to S494 are the same as operations S370 to S394 of FIG. 9. Thus, for convenience of explanation, a further description of these operations will be omitted.

FIGS. 12A to 12D are block diagrams illustrating a manner in which a still image and a moving image are processed in the display driver circuit 200c of FIG. 10.

Figure 12A:
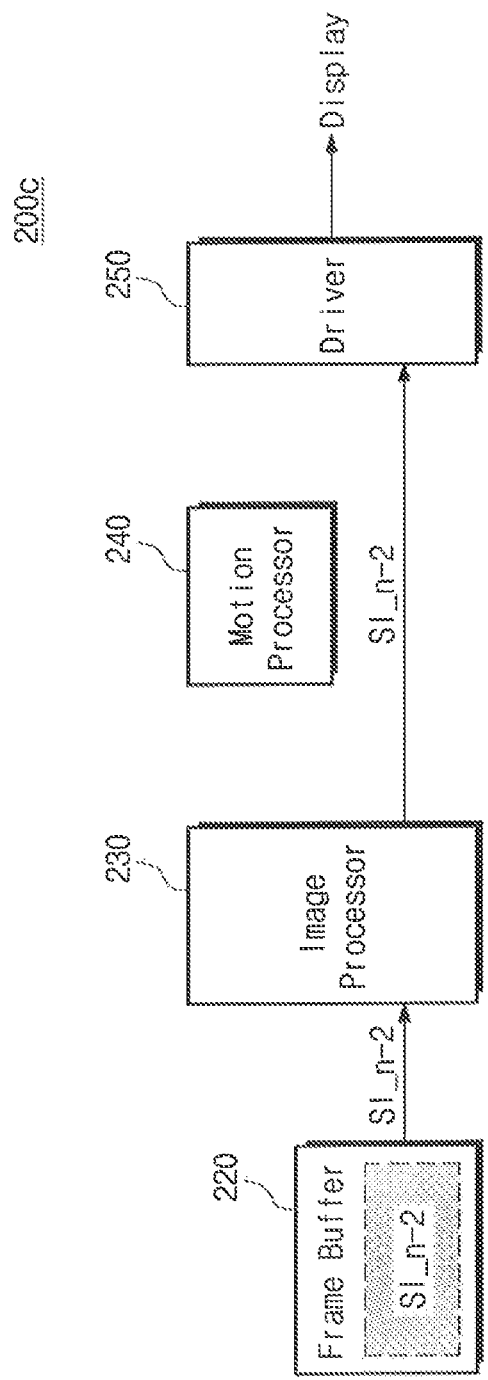
FIGS. 12A to 12D are block diagrams illustrating a manner in which a still image and a moving image are processed in the display driver circuit of FIG. 10.
Figure 12B:
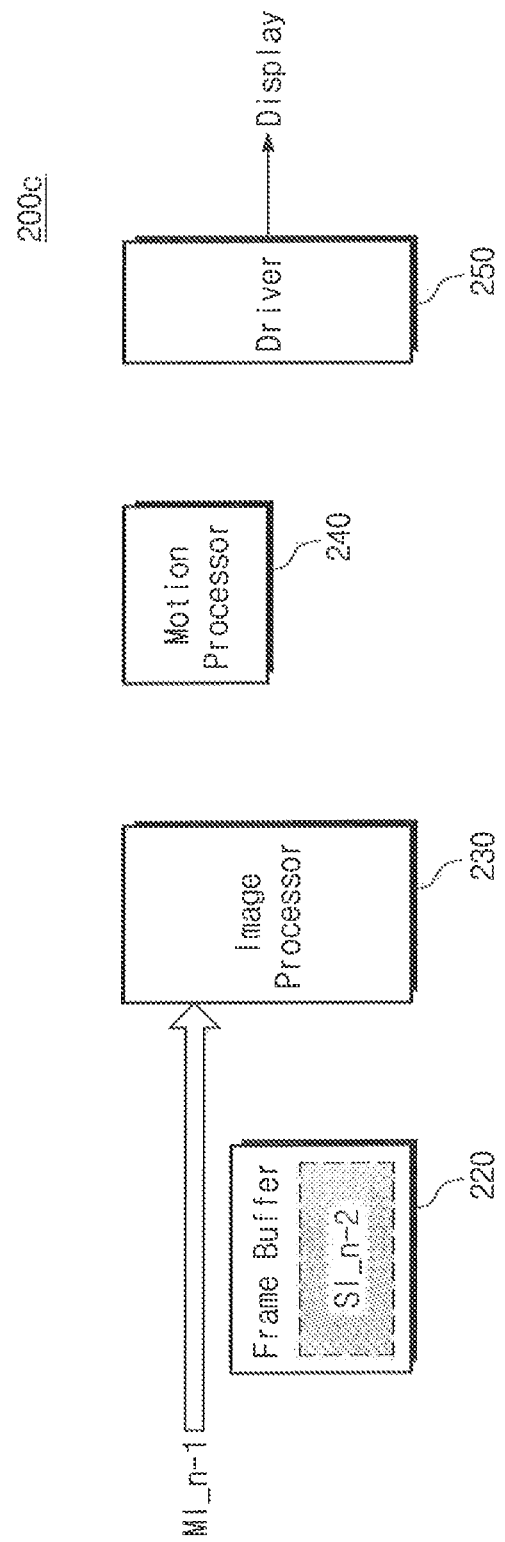
Figure 12C:
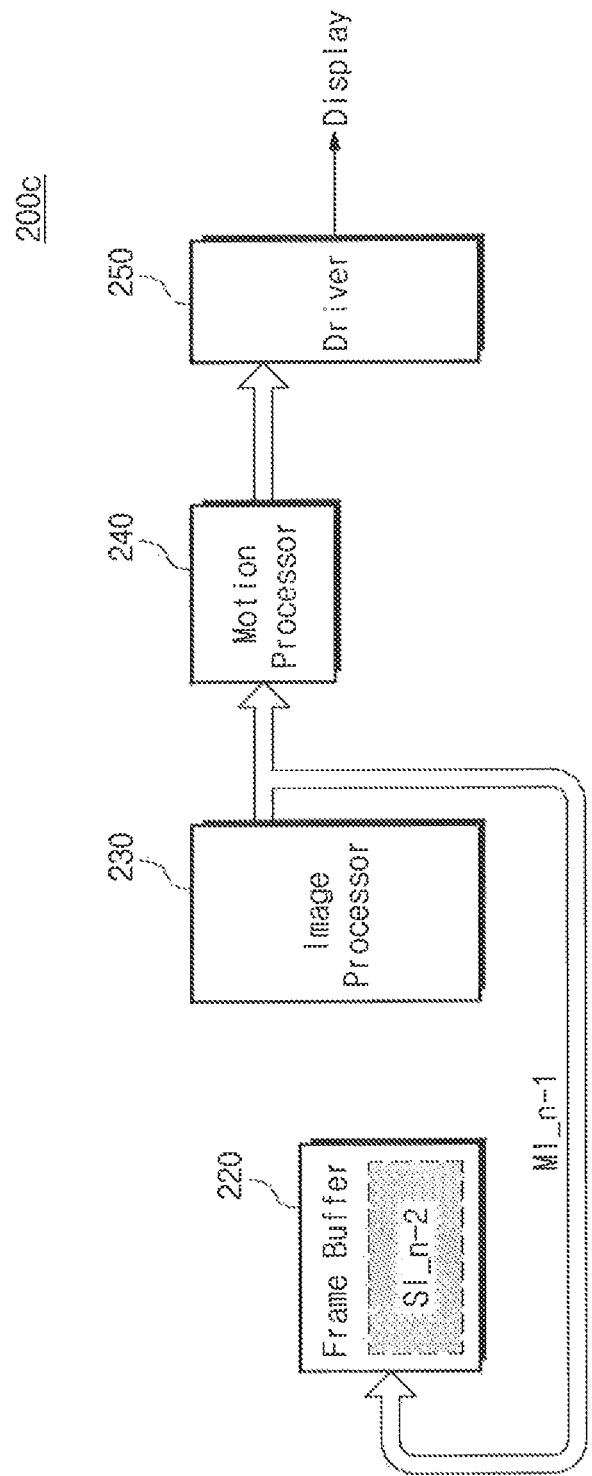
Figure 12D:
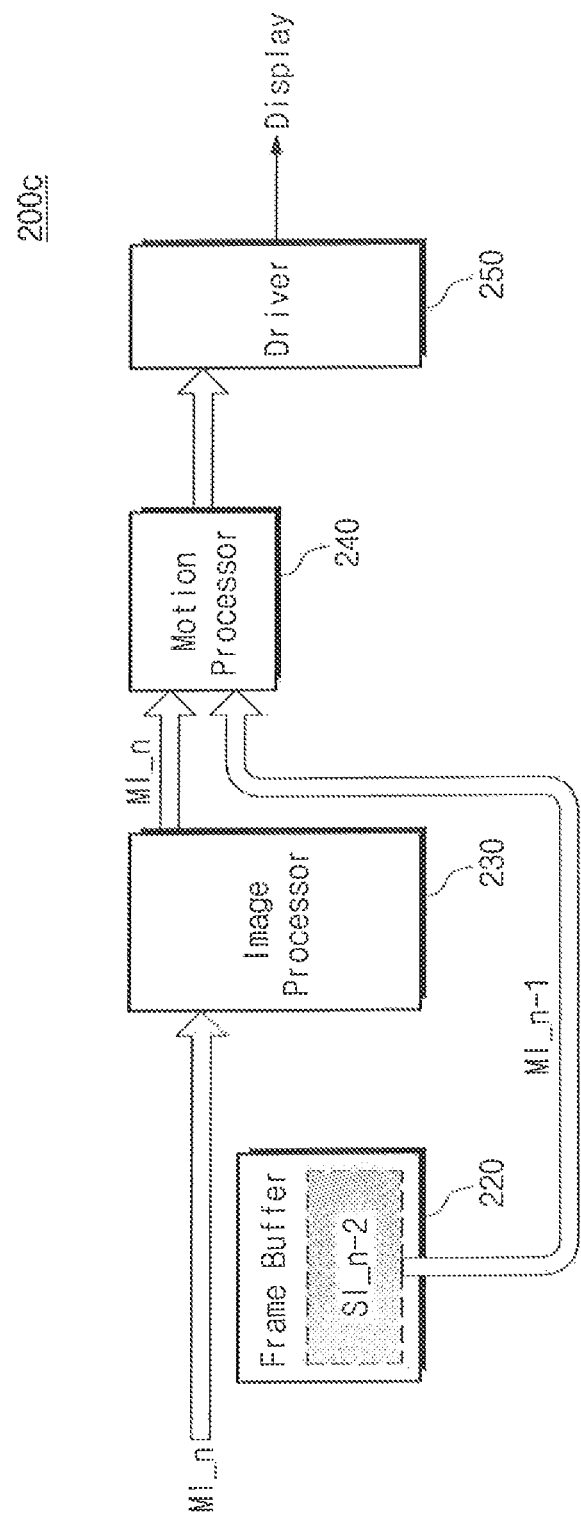

FIG. 12A shows a procedure of processing a still image. FIGS. 12B to 12D sequentially show procedures of processing a moving image frame following the still image. Here, the compression and decompression process will be omitted for convenience of description.

Referring to FIG. 12A, a still image frame SI_n−2 input in the still image (SI) mode is stored in the frame buffer 220. The still image frame SI_n−2 stored in the frame buffer 220 is transferred to the image processor 230. The image processor 230 performs an image enhancement operation on the still image frame SI_n−2. The still image frame SI_n−2 processed by the image processor 230 may be transferred to the driver 250 so as to be output as a driving signal for driving a display.

Referring to FIG. 12B, a mode may switch to the moving image (MI) mode in a state in which the still image frame SI_n−2 is stored in the frame buffer 220. In this state, a moving image frame MI_n−1 following the still image frame SI_n−2 is input from the application processor 20. The moving image frame MI_n−1 is transferred to the image processor 230, not stored in the frame buffer 220. The image processor 230 performs an image enhancement operation on the moving image frame MI_n−1.

Referring to FIG. 12C, the image processor 230 outputs the quality-enhanced moving image frame MI_n−1. In this case, the quality-enhanced moving image frame MI_n−1 is transferred to the motion processor 240 and the frame buffer 220 at the same time. The frame buffer 220 may invalidate the existing still image frame SI_n−2 and may overwrite the moving image frame MI_n−1. In addition, because a previous frame corresponding to the input moving image frame MI_n−1 does not exist, the moving image frame MI_n−1 may be output to the motion processor 240 without the motion compensation operation. The moving image frame MI_n−1 from the motion processor 240 may be transferred to the driver 250 so as to be output as a driving signal for driving a display.

Referring to FIG. 12D, a subsequent moving image frame MI_n is input. Here, for convenience of description, the moving image frame MI_n−1 is called a "previous frame", and the subsequent moving image frame MI_n is called a "current frame". In the case in which the current frame MI_n is transferred to the image processor 230, the image processor 230 may perform an image enhancement operation on the current frame MI_n. At a time when the quality-enhanced current frame MI_n is provided to the motion processor 240, the previous frame MI_n−1 stored in the frame buffer 220 is transferred to the motion processor 240. The motion processor 240 performs the motion compensation operation by using the two sequential moving image frames MI_n−1 and MI_n. The motion compensation-completed moving image frame is transferred to the driver 250 so as to be output as an image signal for driving the display 30.

Here, for convenience of illustration, only the process in which the current frame MI_n is transferred to the motion processor 240 is illustrated, however, the current frame MI_n is also transferred to the frame buffer 220 at the same time with the current frame MI_n. As the current frame MI_n is transferred to the frame buffer 220, the existing previous frame MI_n−1 may be updated.

As described above, the display driver circuit 200 according to an exemplary embodiment of the inventive concept includes the frame buffer 220 that stores the previous frame MI_n−1 in the moving image mode and stores the still image SI in the still image mode. Since the frame buffer 220 is used in both the still image mode and the moving image mode, the display driver circuit 200 capable of driving a moving image and a still image without the need for an additional resource such as, for example, a separate external memory or a separate internal memory, may be implemented.

Figure 13:
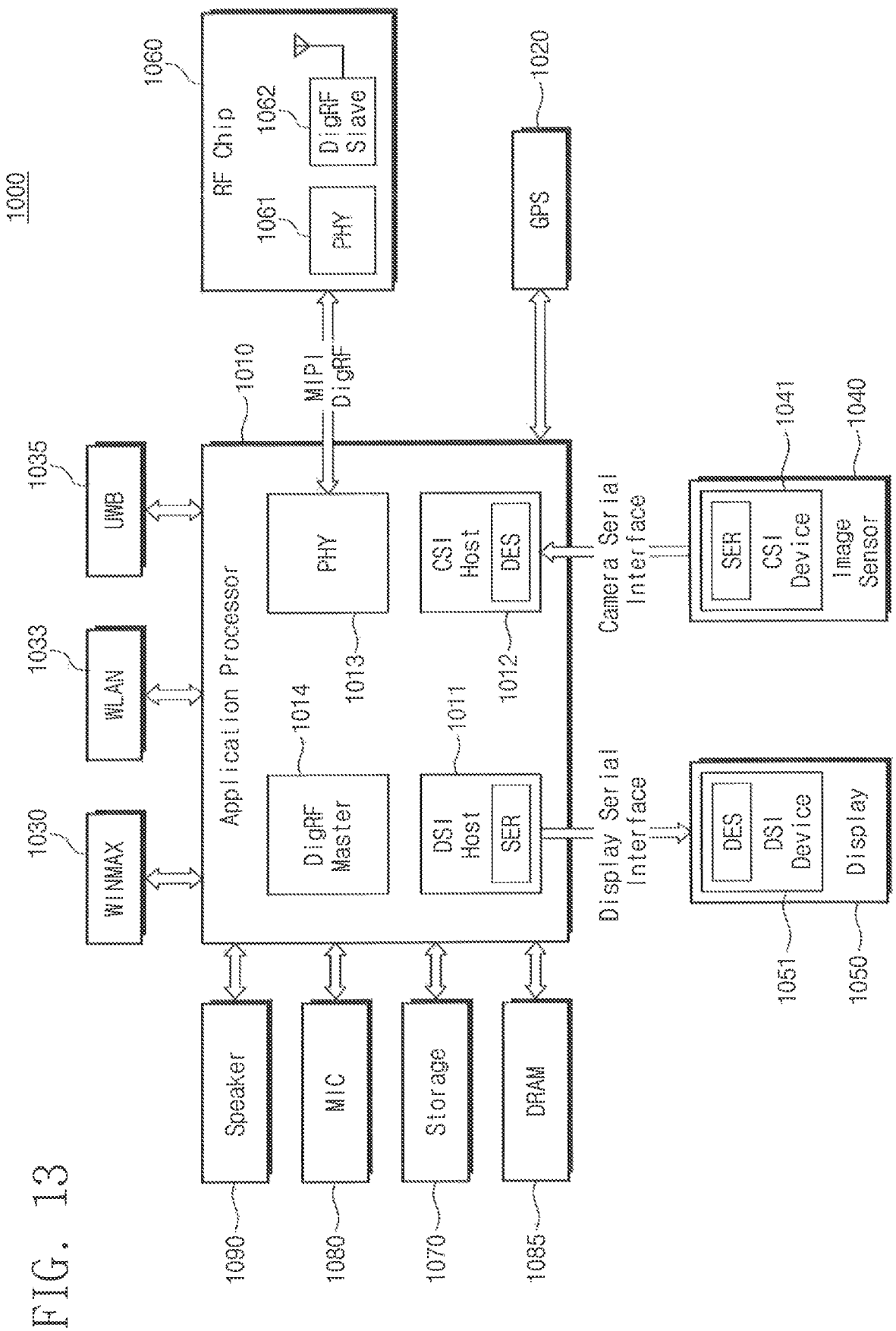
FIG. 13 is a block diagram illustrating an electronic system including an image sensor according to an exemplary embodiment of the inventive concept.

FIG. 13 is a block diagram illustrating an electronic system including an image sensor according to an exemplary embodiment of the inventive concept.

Referring to FIG. 13, an electronic system 1000 may be implemented with a data processing device, which uses or supports a mobile industry processor interface (MIPI), such as, for example, a mobile phone, a personal digital assistant (PDA), a personal media player (PMP), a smartphone, etc. The electronic system 1000 may include an application processor 1010, an image sensor 1040, and a display 1050.

A camera serial interface (CSI) host 1012 implemented in the application processor 1010 may serially communicate with a CSI device 1041 of the image sensor 1040 through a CSI. In this case, for example, an optical deserializer DES may be implemented in the CSI host 1012, and an optical serializer SER may be implemented in the CSI device 1041. In addition, the application processor 1010 may include an image signal processor (ISP) that performs auto white balancing.

A display serial interface (DSI) host 1011 implemented in the application processor 1010 may serially communicate with a DSI device 1051 of the display 1050 through a DSI. In this case, for example, an optical serializer SER may be implemented in the DSI host 1011, and an optical deserializer DES may be implemented in the DSI device 1051.

The electronic system 1000 may include a radio frequency (RF) chip 1060 capable of communicating with the application processor 1010. The application processor 1010 may include a DigRF Master 1014. A PHY 1013 of the electronic system 1000 and a PHY 1061 of the RF chip 1060 may exchange data in compliance with a MIPI DigRF interface.

The electronic system 1000 may further include a GPS 1020, storage 1070, a microphone 1080, a DRAM 1085, and a speaker 1090. The electronic system 1000 may communicate by using, for example, a Wimax interface 1030, a WLAN interface 1033, a UWB interface 1035, etc.

As is traditional in the field of the inventive concept, exemplary embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

A display driver circuit according to an exemplary embodiment of the inventive concept may provide high quality reproduction of a moving image without an increase in a capacity of a frame buffer. Accordingly, a low-power display driver circuit for driving a display of a mobile device may be implemented with low cost.

While the inventive concept has been described with reference to exemplary embodiments thereof, it will be apparent to those of ordinary skill in the art that various changes and modifications may be made thereto without departing from the spirit and scope of the inventive concept as set forth in the following claims.

What is claimed is:

1. A display driver circuit comprising:
 a receiver configured to receive a still image or a moving image from an external source;
 a frame buffer configured to store the still image from the receiver in a still image mode and having a memory size corresponding to the still image;
 an image processor configured to perform an image enhancement operation on the still image transferred from the frame buffer in the still image mode and perform the image enhancement operation on the moving image received from the receiver in a moving image mode,
 wherein the frame buffer is further configured to store the enhanced moving image output from the image processor in the moving image mode;
 a motion processor configured to perform a motion compensation operation using an Nth frame of the enhanced moving image from the image processor and an (N−1)th frame of the enhanced moving image stored in the frame buffer, in the moving image mode;
 a driver configured to output the enhanced still image from the image processor in the still image mode, and output the compensated moving image from the motion processor; and
 a first multiplexer and a second multiplexer connected to the receiver, wherein the frame buffer has a memory size corresponding to the still image, and
 in the still image mode, the first multiplexer transfers the still image to the frame buffer to be processed in an order of the frame buffer, the image processor, and the driver, and in the moving image mode, the second multiplexer transfers the moving image to the image processor to be processed in an order of the image processor, the frame buffer, the motion processor, and the driver.

2. The display driver circuit of claim 1, wherein, after the motion compensation operation is performed, the (N−1)th frame of the enhanced moving image stored in the frame buffer is updated with the Nth frame of the enhanced moving image output from the image processor.

3. The display driver circuit of claim 1, wherein the motion processor performs at least one of a motion blur compensation operation and a motion vector estimation operation by using the Nth frame and the (N−1)th frame output from the frame buffer in synchronization with the Nth frame.

4. The display driver circuit of claim 1, wherein the receiver is further configured to identify the moving image mode or the still image mode with reference to a command or a control signal provided from the external source.

5. The display driver circuit of claim 4, wherein the receiver detects a pattern of image data input from the external source to identify the moving image mode or the still image mode.

6. The display driver circuit of claim 5, wherein
 the first multiplexer is configured to transfer the still image output from the receiver to the frame buffer in the still image mode and to transfer the Nth frame of the enhanced moving image output from the image processor to the frame buffer in the moving image mode; and
 the second multiplexer is configured to transfer the still image output from the frame buffer to the image processor in the still image mode and to transfer the moving image output from the receiver to the image processor in the moving image mode.

7. The display driver circuit of claim 6, further comprising:
 wherein the image data are compressed image data,
 a standard decoder configured to decompress the still image or the moving image output from the second multiplexer and to provide a result of the decompression to the image processor;
 an internal encoder configured to compress the Nth frame of the enhanced moving image output from the image processor and to transfer the compressed Nth frame of the enhanced moving image to the first multiplexer; and
 an internal decoder configured to decompress the (N−1)th frame of the enhanced moving image stored in the frame buffer and to provide the decompressed (N−1)th frame of the enhanced moving image to the motion processor.

8. The display driver circuit of claim 6, further comprising:
 a controller configured to control the first multiplexer and the second multiplexer depending on the moving image mode or the still image mode.

9. An operating method of a display driver circuit which includes a frame buffer storing a still image, an image processor performing an image enhancement operation, a motion processor performing a motion compensation operation on a moving image, and a driver, the method comprising:
  identifying a mode of image data input from an external device, the mode including a moving image mode and a still image mode;
  performing, by the image processor, the image enhancement operation on an Nth frame of the image data in the moving image mode;
  performing, by the motion processor, the motion compensation operation on the image enhancement operation-completed Nth frame based on an (N−1)th frame of the image data stored in the frame buffer in the moving image mode;
  outputting, by the driver, the motion compensation operation-completed Nth frame in the moving image mode;
  storing the image enhancement operation-completed Nth frame in the frame buffer in the moving image mode;
  storing the image data in the frame buffer in the still image mode;
  performing, by the image processor, the image enhancement operation on the image data stored in the frame buffer in the still image mode; and
  outputting, by the driver, the image enhancement operation-completed image data in the still image mode,
  wherein the frame buffer has a memory size corresponding to the still image, and
  wherein in the still image mode, a first multiplexer transfers the still image to the frame buffer to be processed in an order of the frame buffer, the image processor, and the driver, and in the moving image mode, a second multiplexer transfers the moving image to the image processor to be processed in an order of the image processor, the frame buffer, the motion processor, and the driver.

10. The method of claim 9, wherein, in the motion compensation operation, the motion processor is provided with the (N−1)th frame stored in the frame buffer and the Nth frame.

11. The method of claim 10, wherein the motion compensation operation includes at least one of a motion blur compensation operation and a motion vector estimation operation which are based on a result of comparing the Nth frame and the (N−1)th frame.

12. The method of claim 10, wherein the image data are provided in a compressed format, further comprising:
  decompressing the Nth frame before the image enhancement operation is applied.

13. The method of claim 12, further comprising:
  decompressing the (N−1)th frame stored in the frame buffer and providing the decompressed (N−1)th frame to the motion processor.

14. The method of claim 12, further comprising:
  compressing the Nth frame before the Nth frame experiencing the image enhancement operation is stored in the frame buffer.

15. The method of claim 9, further comprising:
  skipping the motion compensation operation when the Nth frame corresponds to a first image input in the moving image mode.

16. A mobile device comprising:
  an application processor configured to generate a moving image or a still image;
  a display driver circuit configured to receive the moving image or the still image to output a driving signal,
  wherein, upon receiving a first frame of the moving image, the display driver circuit is configured to perform a first image enhancement processing on the first frame and store the enhanced first frame in the frame buffer,
  wherein, upon receiving a second frame of the moving image following the first frame, the display driver circuit is configured to generate the driving signal by performing the first image enhancement processing on the second frame and by performing a motion compensation operation on the enhanced second frame based on the enhanced first frame stored in the frame buffer, and
  wherein, upon receiving the still image, the display driver circuit is configured to store the still image in the frame buffer and generate the driving signal by performing a second image enhancement processing on the still image stored in the frame buffer;
  an image processor configured to perform the first image enhancement processing on the first frame and the second frame and to perform the second image enhancement processing on the still image;
  a motion processor configured to perform the motion compensation operation by using the first frame and the second frame;
  a first multiplexer and a second multiplexer; and
  a display configured to display the moving image or the still image based on the driving signal,
  wherein the frame buffer has a memory size corresponding to the still image,
  wherein in a still image mode, the first multiplexer transfers the still image to the frame buffer to be processed in an order of the frame buffer, the image processor, and the driver, and in a moving image mode, the second multiplexer transfers the moving image to the image processor to be processed in an order of the image processor, the frame buffer, the motion processor, and the driver.

17. The mobile device of claim 16, wherein the display driver circuit includes:
  a receiver configured to receive and identify the moving image or the still image.

18. The mobile device of claim 17, wherein
  the first multiplexer is configured to transfer the still image output from the receiver to the frame buffer in the still image mode and to transfer the first frame or the second frame output from the image processor to the frame buffer in the moving image mode; and
  the second multiplexer is configured to transfer the still image output from the frame buffer to the image processor in the still image mode to the image processor and to transfer the second frame output from the receiver to the image processor in the moving image mode.

19. The mobile device of claim 18, wherein the application processor transfers the moving image or the still image in a compressed format, and
  wherein the display driver circuit further includes:
  a standard decoder configured to decompress the still image or the second frame output from the second multiplexer and to provide a result of the decompression to the image processor;
  an internal encoder configured to compress the first frame output from the image processor and to transfer the compressed first frame to the first multiplexer; and
  an internal decoder configured to decompress the compressed first frame stored in the frame buffer and to provide the decompressed first frame to the motion processor.

20. The mobile device of claim 18, wherein the display driver circuit further includes:
   a controller configured to control the first multiplexer and the second multiplexer depending on the moving image mode or the still image mode.

* * * * *